(12) United States Patent  
Ionel et al.

(10) Patent No.: US 7,821,175 B2  
(45) Date of Patent: Oct. 26, 2010

(54) STATOR ASSEMBLY FOR AN ELECTRIC MACHINE AND METHOD OF MANUFACTURING THE SAME

(75) Inventors: Dan M. Ionel, Fox Point, WI (US); Stephen J. Dellinger, Houston, OH (US); Robert J. Heideman, Kewaskum, WI (US); Alan E. Lesak, Franklin, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

(21) Appl. No.: 12/333,719

(22) Filed: Dec. 12, 2008

(65) Prior Publication Data

US 2009/0085415 A1   Apr. 2, 2009

Related U.S. Application Data

(63) Continuation of application No. 12/028,462, filed on Feb. 8, 2008, now Pat. No. 7,468,570, and a continuation of application No. 11/263,340, filed on Oct. 31, 2005, now Pat. No. 7,348,706.

(51) Int. Cl.  
*H02K 1/06* (2006.01)

(52) U.S. Cl. .................... 310/216.009; 310/43; 310/194

(58) Field of Classification Search ............ 310/216.09, 310/43, 216.01, 194, 254.1  
See application file for complete search history.

(56) References Cited

U.S. PATENT DOCUMENTS

| | | |
|---|---|---|
| 1,779,950 A | 10/1930 | Reichel |
| 1,934,981 A | 11/1933 | Johnson |
| 2,506,629 A | 5/1950 | Bilbe et al. |
| 2,953,699 A | 9/1960 | Redding, Jr. |
| 2,958,292 A | 11/1960 | Lipe et al. |
| 3,131,462 A | 5/1964 | Owings et al. |
| 3,390,289 A | 6/1968 | Dijkenetal |

(Continued)

FOREIGN PATENT DOCUMENTS

CN    1612439    5/2005

(Continued)

OTHER PUBLICATIONS

Mitsubishi, IEEE Industry Applications Magazine, Motors and Drives Putting Electricity to Work, Nov./Dec. 2005, pp. 38-43.

(Continued)

*Primary Examiner*—Thanh Lam  
(74) *Attorney, Agent, or Firm*—Michael Best & Friedrich LLP

(57) ABSTRACT

A stator for an electric machine includes a plurality of core segments interconnected with one another. At least one core segment includes a plurality of teeth and a back portion that at least partially interconnects the teeth. A first one-piece mold defines a first end insulator portion and a plurality of slot insulator portions, and a second one-piece mold defines a second end insulator portion and a second plurality of slot insulator portions. The plurality of core segments is positioned between the first mold and the second mold such that the molds align and insulate the core portions. The stator also includes a plurality of coils. Each coil surrounds at least a portion of one tooth.

31 Claims, 26 Drawing Sheets

U.S. PATENT DOCUMENTS

| | | | |
|---|---|---|---|
| 3,440,460 | A | 4/1969 | Postema |
| 3,443,137 | A | 5/1969 | McElroy |
| 3,466,210 | A | 9/1969 | Wareham |
| 3,686,043 | A | 8/1972 | Broyles et al. |
| 3,694,903 | A | 10/1972 | Deming |
| 3,740,598 | A | 6/1973 | Hallerback |
| 3,742,269 | A | 6/1973 | Holper et al. |
| 3,813,763 | A | 6/1974 | Church |
| 3,834,013 | A | 9/1974 | Gerstle |
| 3,849,683 | A | 11/1974 | Leistner |
| 3,963,949 | A | 6/1976 | Church |
| 3,983,621 | A | 10/1976 | Donahoo |
| 4,080,724 | A | 3/1978 | Gillette |
| 4,103,195 | A | 7/1978 | Torossian et al. |
| 4,365,180 | A | 12/1982 | Licata et al. |
| 4,438,558 | A | 3/1984 | Mitsui |
| 4,475,051 | A | 10/1984 | Chai et al. |
| 4,990,809 | A | 2/1991 | Artus et al. |
| 5,095,610 | A | 3/1992 | Schultz et al. |
| 5,176,946 | A | 1/1993 | Wieloch |
| 5,276,958 | A | 1/1994 | Larsen |
| 5,583,387 | A | 12/1996 | Takeuchi et al. |
| 5,592,731 | A | 1/1997 | Huang et al. |
| 5,619,086 | A | 4/1997 | Steiner |
| 5,729,072 | A | 3/1998 | Hirano et al. |
| 5,767,606 | A | 6/1998 | Bresolin |
| 5,786,651 | A | 7/1998 | Suzuki |
| 5,859,486 | A | 1/1999 | Nakahara et al. |
| 5,952,754 | A | 9/1999 | Mok |
| 5,969,455 | A * | 10/1999 | Sakamoto ............... 310/194 |
| 6,049,153 | A | 4/2000 | Nishiyama et al. |
| 6,069,428 | A | 5/2000 | Nelson |
| 6,081,059 | A | 6/2000 | Hsu |
| 6,121,711 | A | 9/2000 | Nakahara et al. |
| 6,127,753 | A | 10/2000 | Yamazaki et al. |
| 6,147,431 | A | 11/2000 | Asao et al. |
| 6,153,951 | A | 11/2000 | Morita et al. |
| 6,167,610 | B1 | 1/2001 | Nakahara et al. |
| 6,219,900 | B1 | 4/2001 | Suzuki |
| 6,226,856 | B1 | 5/2001 | Kazama et al. |
| 6,317,962 | B1 | 11/2001 | Adachi et al. |
| 6,323,571 | B1 | 11/2001 | Nakahara et al. |
| 6,329,729 | B1 | 12/2001 | Sakamoto |
| 6,337,529 | B1 | 1/2002 | Higashino et al. |
| 6,362,553 | B1 | 3/2002 | Nakahara et al. |
| 6,448,685 | B1 | 9/2002 | Mayer et al. |
| 6,459,187 | B1 | 10/2002 | Oohashi et al. |
| 6,487,769 | B2 | 12/2002 | Ketterer et al. |
| 6,504,284 | B1 | 1/2003 | Kazama et al. |
| 6,578,255 | B2 | 6/2003 | Lawrence et al. |
| 6,630,766 | B1 | 10/2003 | Kim et al. |
| 6,634,080 | B2 | 10/2003 | Bareis et al. |
| 6,658,721 | B2 | 12/2003 | Kazama et al. |
| 6,670,732 | B2 | 12/2003 | Sakamoto |
| 6,741,005 | B2 | 5/2004 | Vohlgemuth |
| 6,777,850 | B2 | 8/2004 | Harada et al. |
| 6,777,852 | B2 | 8/2004 | Ishikawa et al. |
| 6,784,587 | B2 | 8/2004 | Miyake et al. |
| 6,856,064 | B2 | 2/2005 | Masumoto et al. |
| 6,891,299 | B2 | 5/2005 | Coupart et al. |
| 6,892,439 | B1 | 5/2005 | Neal et al. |
| 6,975,049 | B2 | 12/2005 | Ionel et al. |
| 7,122,933 | B2 | 10/2006 | Horst et al. |
| 7,294,942 | B2 * | 11/2007 | Lee et al. ............... 310/43 |
| 7,382,075 | B2 | 6/2008 | Wang et al. |
| 7,557,486 | B2 * | 7/2009 | Choi et al. ............... 310/266 |
| 7,615,895 | B2 * | 11/2009 | Lee et al. ............... 310/43 |
| 2001/0005933 | A1 | 7/2001 | Kazama et al. |
| 2001/0015006 | A1 | 8/2001 | Vohlgemuth |
| 2001/0017500 | A1 | 8/2001 | Hirama et al. |
| 2002/0121831 | A1 | 9/2002 | Egawa et al. |
| 2002/0130582 | A1 | 9/2002 | Oketani et al. |
| 2002/0135263 | A1 | 9/2002 | Neal |
| 2002/0163277 | A1 | 11/2002 | Miyake et al. |
| 2003/0066183 | A1 | 4/2003 | Nouzumi |
| 2003/0127938 | A1 | 7/2003 | Shen et al. |
| 2004/0051417 | A1 | 3/2004 | Yamazaki et al. |
| 2004/0061407 | A1 | 4/2004 | Miyake et al. |
| 2004/0070304 | A1 | 4/2004 | Enomoto et al. |
| 2004/0074079 | A1 | 4/2004 | Jack et al. |
| 2004/0124733 | A1 | 7/2004 | Yamamoto et al. |
| 2005/0017590 | A1 | 1/2005 | Ionel et al. |
| 2005/0067912 | A1 | 3/2005 | Murakami |
| 2005/0093381 | A1 | 5/2005 | Ionel |
| 2005/0223541 | A1 | 10/2005 | Ionel |
| 2006/0038452 | A1 | 2/2006 | Lesak |
| 2007/0205682 | A1 * | 9/2007 | Choi et al. ............... 310/114 |
| 2008/0084126 | A1 * | 4/2008 | Lee et al. ............... 310/43 |
| 2008/0129131 | A1 * | 6/2008 | Shin et al. ............... 310/71 |
| 2009/0324435 | A1 * | 12/2009 | Sears et al. ............... 417/423.7 |

FOREIGN PATENT DOCUMENTS

| | | |
|---|---|---|
| FR | 2854743 | 11/2004 |
| JP | 10-004640 | 6/1998 |

OTHER PUBLICATIONS

Mitsubishi, IEEE Industry Applications Conference 2003, 38th IAS Annual Meeting Conference Record, Oct. 12-16.

Mitsubishi, Ninth International Refrigeration and Air Conditioning Conference at Purdue 2002, CD Proceedings.

Second International Conference on Power Electronics, Machines and Drives, Simplifying the Manufacturing Process for Electrical Machines, Mar. 31-Apr. 2, 2004.

* cited by examiner

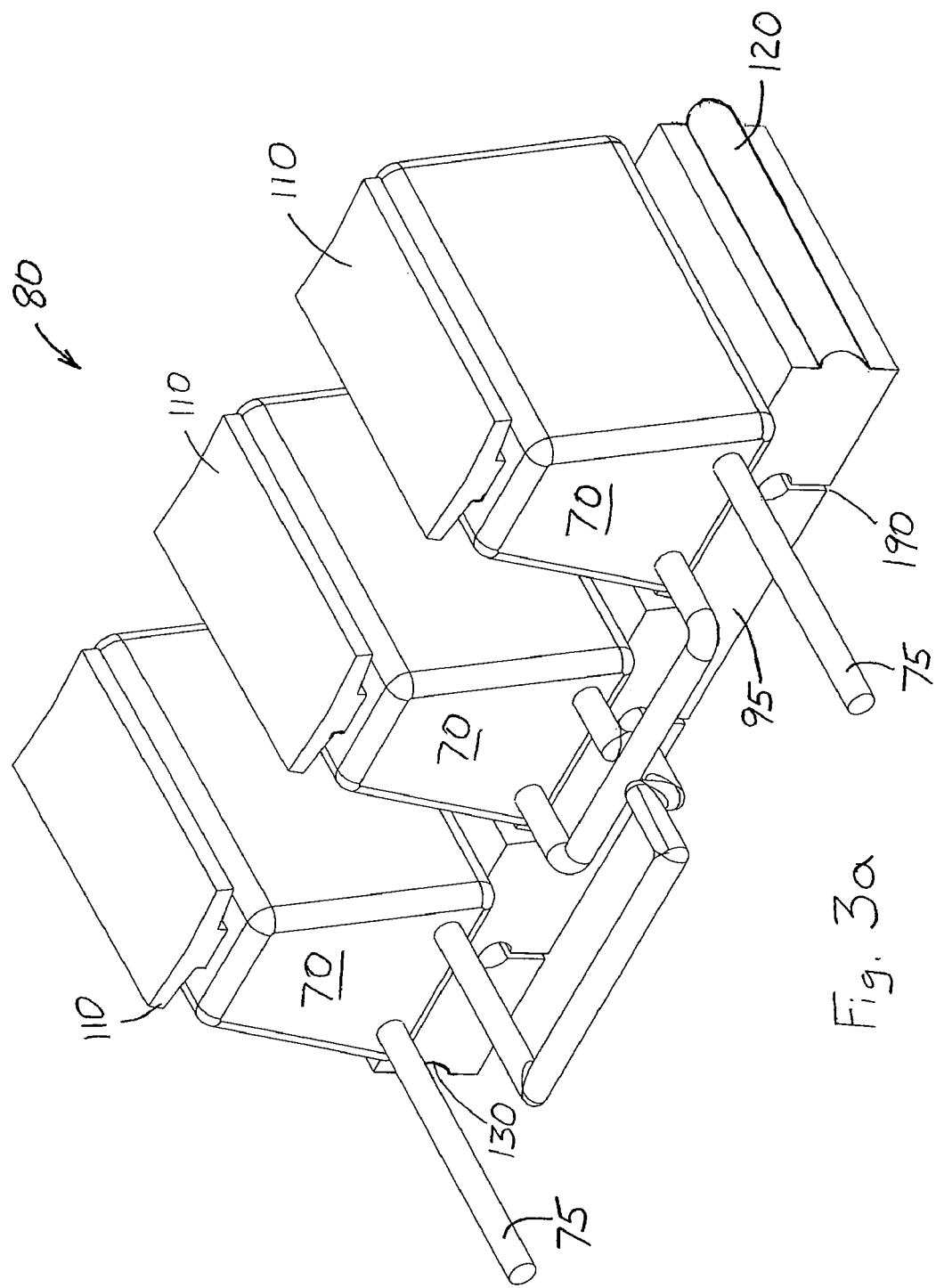

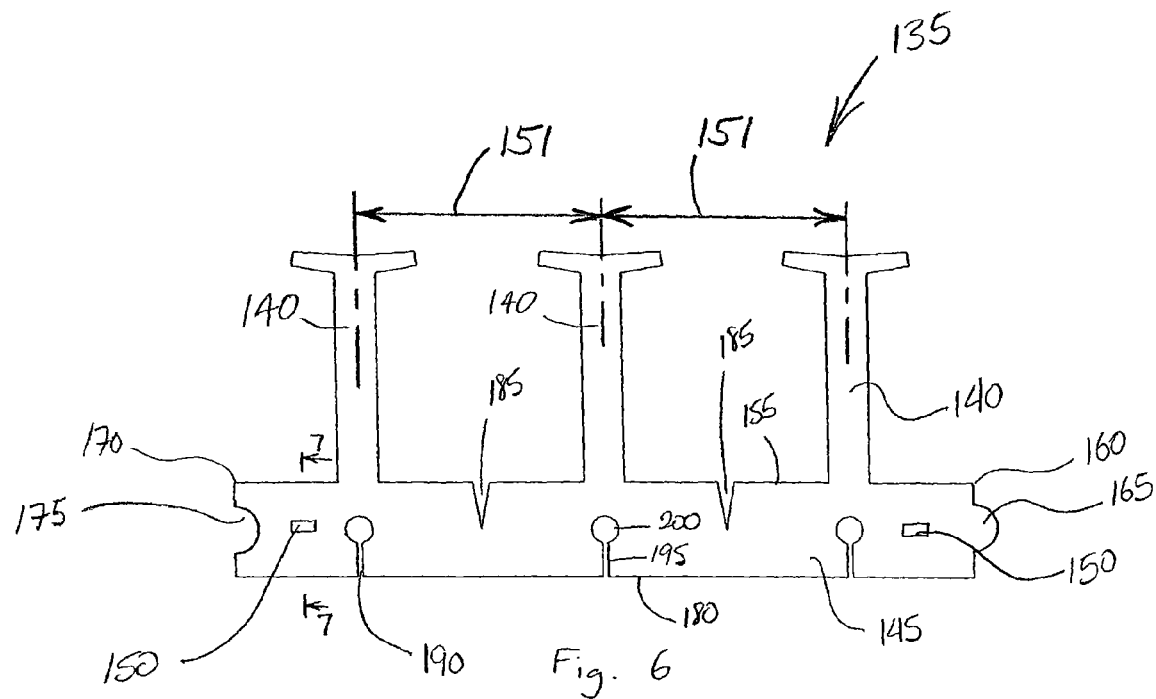
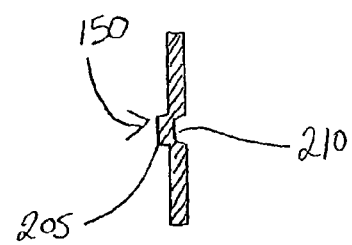
Fig. 6
Fig. 7

US 7,821,175 B2

STATOR ASSEMBLY FOR AN ELECTRIC MACHINE AND METHOD OF MANUFACTURING THE SAME

RELATED APPLICATION DATA

This application is a continuation application of U.S. patent application Ser. No. 12/028,462, now U.S. Pat. No. 7,468,570, filed on Feb. 8, 2008, which is a continuation of U.S. patent application Ser. No. 11/263,340, now U.S. Pat. No. 7,348,706, filed on Oct. 31, 2005, the entire contents of each are incorporated herein by reference.

BACKGROUND

The invention relates to a stator assembly for an electric machine and a method of manufacturing the same.

SUMMARY

In one embodiment, the invention provides a stator for an electric machine. The stator includes a plurality of core segments interconnected with one another. At least one core segment includes a plurality of teeth and a back portion that at least partially interconnects the teeth. A first one-piece mold defines a first end insulator portion and a plurality of slot insulator portions, and a second one-piece mold defines a second end insulator portion and a second plurality of slot insulator portions. The plurality of core segments is positioned between the first mold and the second mold such that the molds align and insulate the core portions. The stator also includes a plurality of coils. Each coil surrounds at least a portion of one tooth.

In another embodiment, the invention provides a stator for an electric machine. The stator includes a first one-piece mold that includes a first end insulator portion and a plurality of slot insulator portions and a first stator core portion that includes a first back portion and a first plurality of teeth that cooperate to define a first plurality of slots. The first stator core portion is positioned within the first mold such that the first back portion contacts the first end insulator portion and the first plurality of slot insulator portions fit within the first plurality of slots. A second one-piece mold includes a second end insulator portion and a second plurality of slot insulator portions and a second stator core portion includes a second back portion and a second plurality of teeth that cooperate to define a second plurality of slots. The second stator core portion is positioned within the second mold such that the second back portion contacts the second end insulator portion and the second plurality of slot insulator portions fit within the second plurality of slots. The first mold and the second mold are connected to one another such that the first plurality of slots is aligned with the second plurality of slots to define complete slots. The first plurality of slot insulator portions and the second plurality of slot insulator portions cooperate to completely insulate the complete slots.

Other aspects and embodiments of the invention will become apparent by consideration of the detailed description and accompanying drawings.

BRIEF DESCRIPTION OF THE DRAWINGS

The detailed description particularly refers to the accompanying figures in which:

FIG. 3a is a perspective view of the stator portion (module) of FIG. 3 before it is bent;

FIG. 6 is a front view of a lamination suited for use in manufacturing the core segment of FIG. 5;

FIG. 7 is a sectional view taken along line 7-7 of FIG. 6;

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way.

Figure 1:
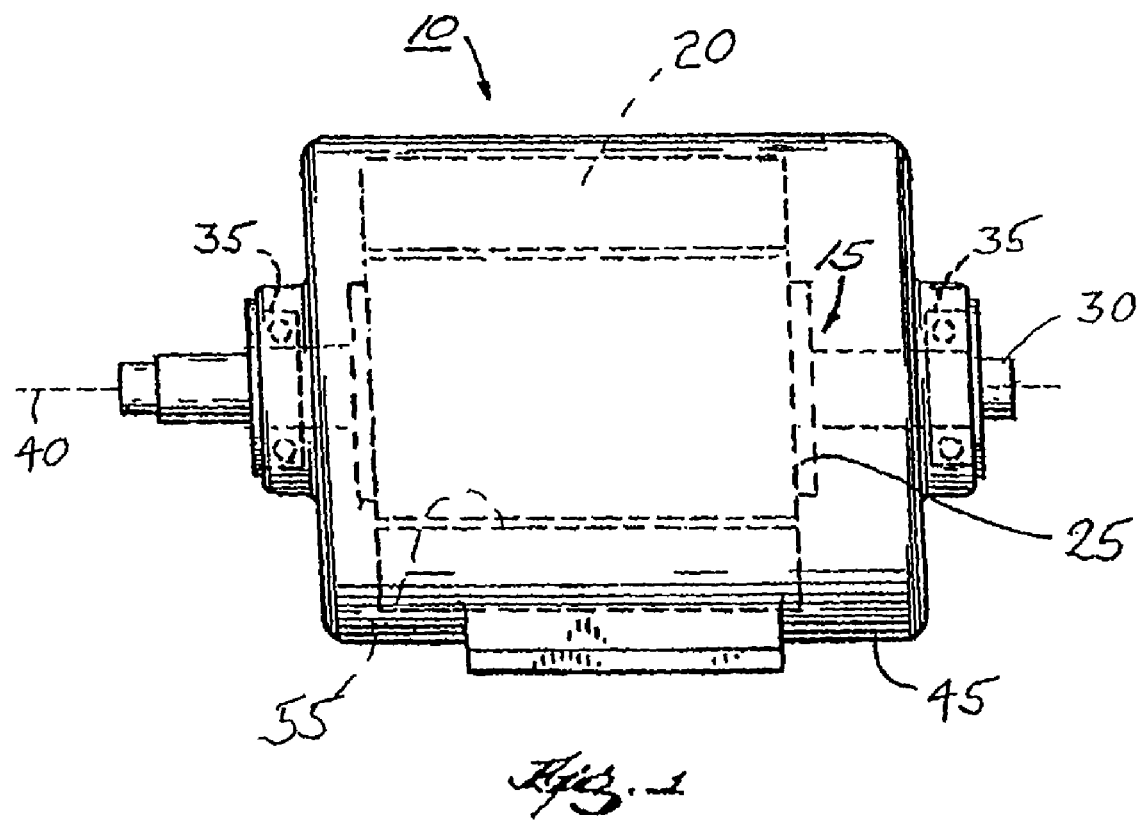
FIG. 1 is a schematic side view of a motor including a stator.

As illustrated in FIG. 1, a motor 10 generally includes a rotor 15 disposed within a stator 20. The rotor 15 includes a rotor core 25 and a shaft 30 that extends from one or both ends of the rotor core 25 to provide support points and to provide a convenient shaft power take off point. Generally, two or more bearings 35 engage the rotor shaft 30 and support the rotor 15 such that it rotates about a rotational axis 40. The motor 10 also includes a housing 45 that supports the stator 20. The stator 20 defines a substantially cylindrical aperture 55 that is centered on the rotational axis 40. When the rotor 15 is in its operating position relative to the stator 20, the rotor core 25 is generally centered within the aperture 55 such that a small air gap is established between the rotor core 25 and the stator 20. The air gap allows for relatively free rotation of the rotor 15 within the stator 20.

The motor 10 illustrated in FIG. 1 is a permanent magnet brushless motor. As such, the rotor 15 includes permanent magnets that define two or more magnetic poles. The stator 20 includes conductors (e.g., wire) forming one or more phase windings that can be selectively energized to produce a varying magnetic field. The permanent magnets of the rotor 15 interact with the varying magnetic field of the stator 20 to produce rotor rotation. As one of ordinary skill will realize, the present invention is suited for other types of electric motors (e.g., induction motors, variable reluctance motors) and other arrangements of motors (e.g., outer-rotor motors). As such, the invention should not be limited to the permanent magnet brushless motors illustrated herein. Furthermore, one of ordinary skill will realize that the present invention can also be applied to many types of generators. In addition, figures and description presented herein are directed to a stator and/or a motor. However, many of the features described and illustrated could be applied to wound rotors. Thus, while the figures and description refer to a brushless motor and/or a stator, other applications are possible.

Figure 2:
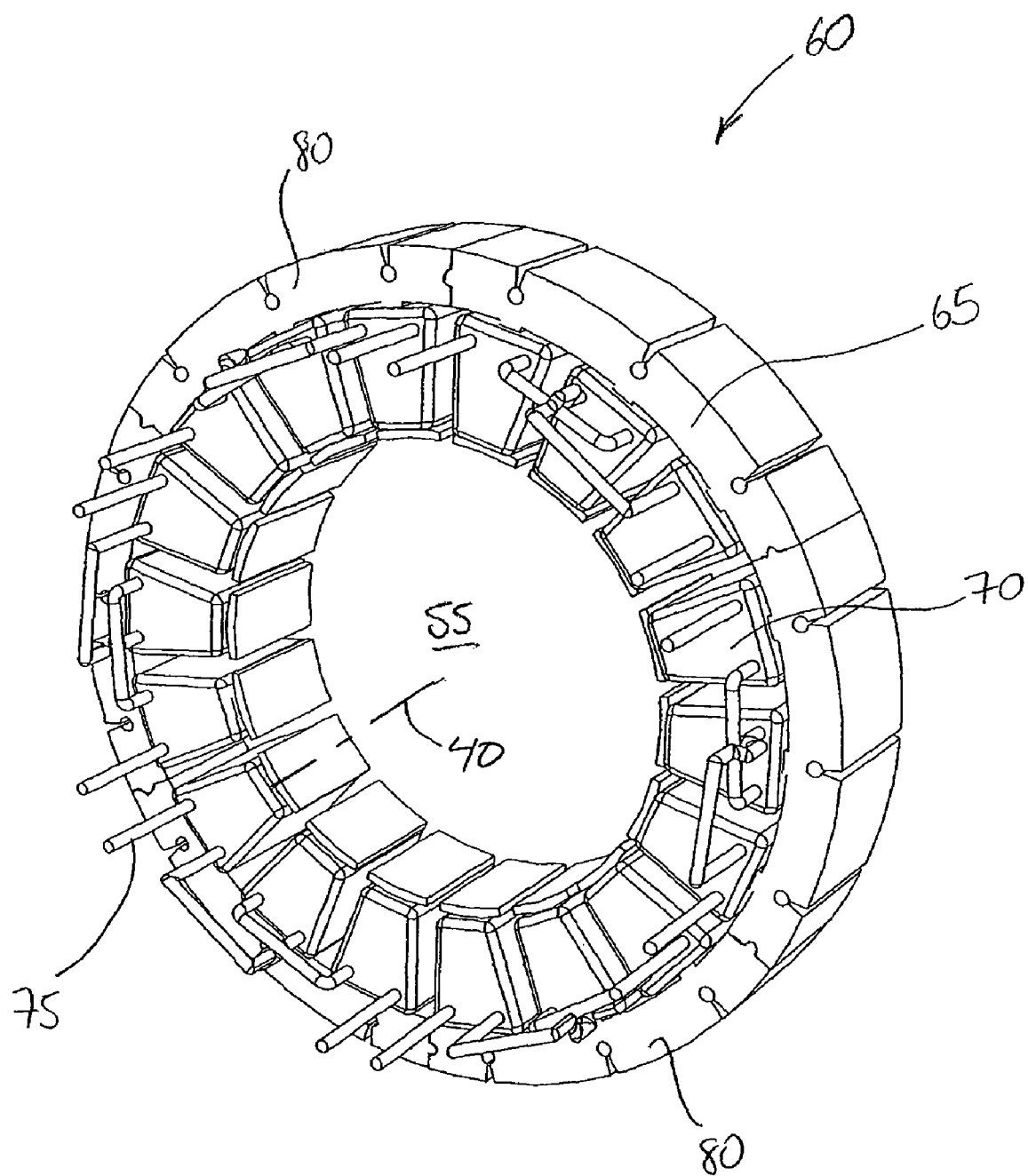
FIG. 2 is a perspective schematic view of a stator including a plurality of stator portions (modules) comprising core segments and coils.

FIG. 2 illustrates one possible stator 60 that is suitable for use with the motor of FIG. 1. The stator 60 includes a core 65, a plurality of coils 70, and a series of electrical leads 75 that interconnect the various coils 70 and extend to a power connection point. Before proceeding it should be noted that the coils illustrated herein are shown schematically as blocks. As one of ordinary skill in the art will realize, the actual coils generally include a conductor that is repeatedly wrapped into a coil shape that generally occupies the space illustrated by the blocks.

The stator 60 includes a plurality of stator portions (modules) 80 that connect to adjacent stator portions 80 to define a closed, generally circular, shape centered on the rotational axis 40 of the rotor 25. The stator portions 80 are arranged to define the stator aperture 55, which receives the rotor 25 for rotation. The construction illustrated in FIG. 2 includes six stator portions 80, though other constructions may be possible employing fewer or more stator portions 80. Each of the six stator portions 80 is substantially similar to the stator portion 80 illustrated in FIGS. 2, 3 and 3a.

Figure 4:
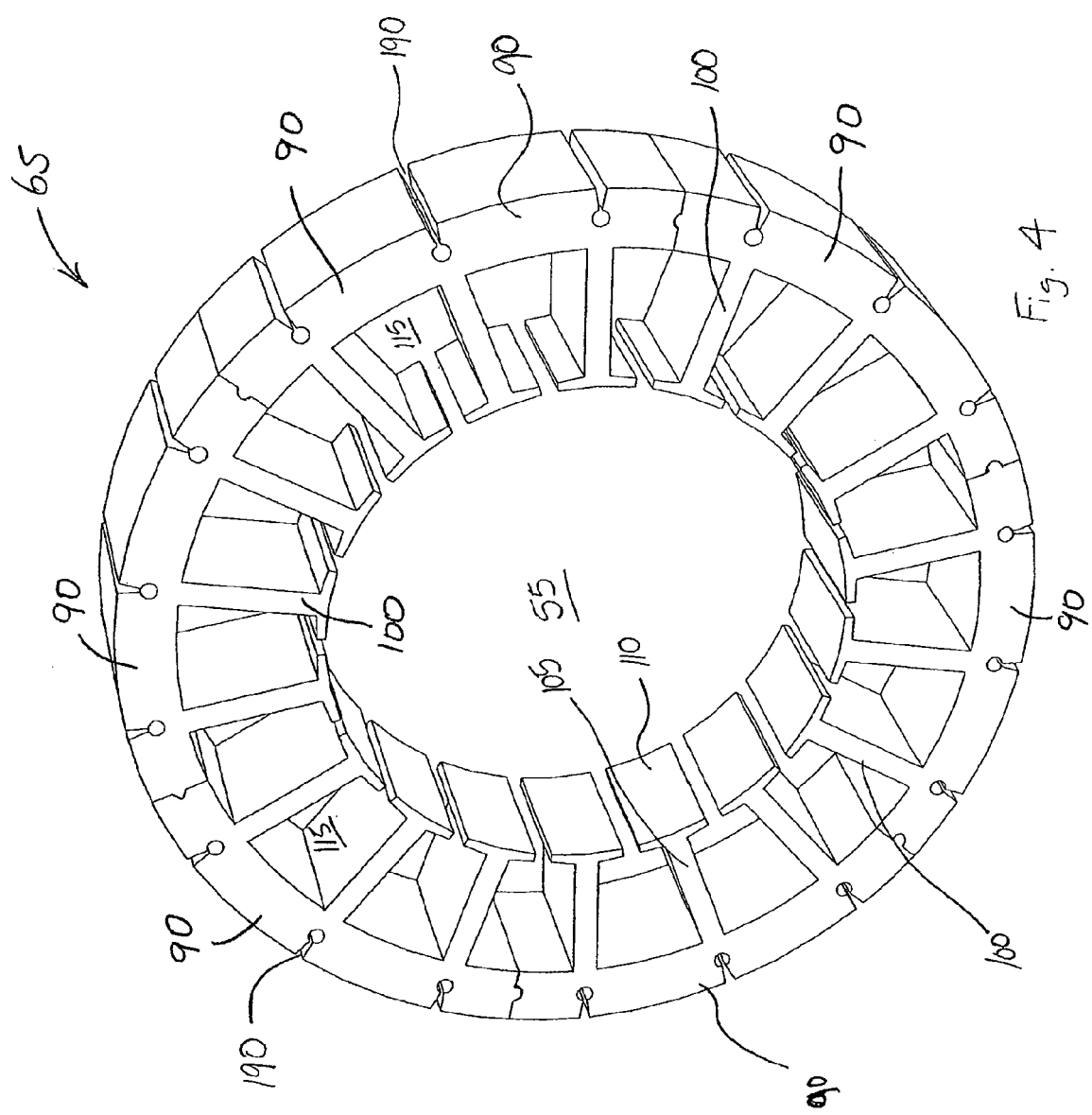
FIG. 4 is a perspective view of a core of the stator of FIG. 2.

FIG. 4 better illustrates the core 65. As can be seen, the core 65 includes six core segments 90 with each core segment 90 connected to two adjacent core segments 90 to define the closed, substantially circular, shape of the completed core 65.

Figure 5:
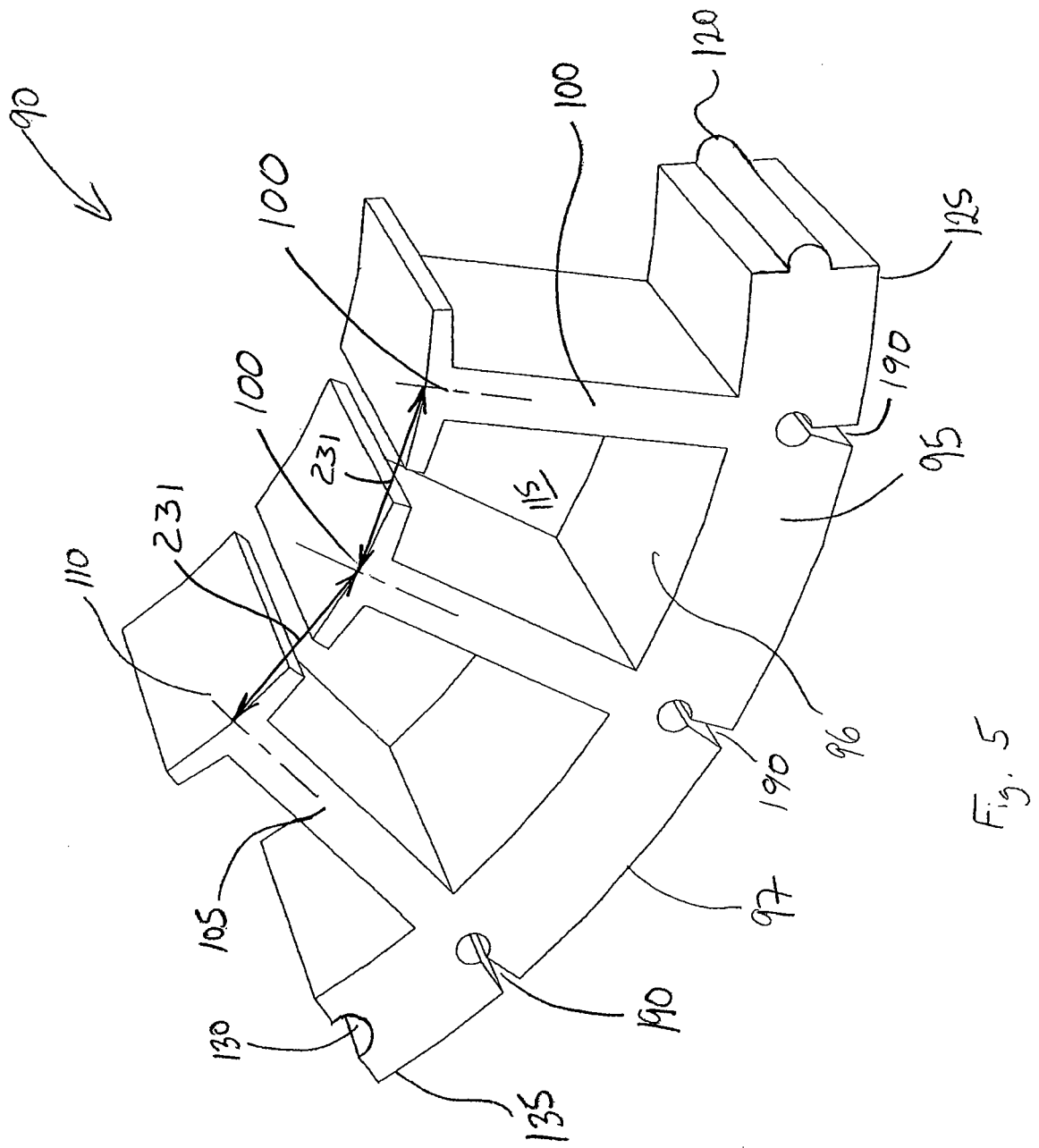
FIG. 5 is a perspective view of a core segment of FIG. 3.

With reference to FIG. 5, one core segment 90 of the core 65 of FIG. 4 is illustrated. Each core segment 90 includes a back (or yoke) portion 95 defining an inner surface 96 and an outer surface 97, and three teeth 100 that extend radially inward from the back portion 95. Each tooth 100 includes a coil-receiving portion 105 and a base 110 positioned at the innermost end of the coil-receiving portion 105. The coil-receiving portion 105 is sized and shaped to receive and support a coil 70, shown in FIG. 3, that may be positioned around the particular tooth 100. The base 110 is generally wider than the coil-receiving portion 105 such that the base 110 retains the coil 70 and inhibits unwanted movement of the coil 70. In addition, the wide base 110 aids in spreading the magnetic field generated when the coil 70 is energized, which reduces cogging and/or ripple torque during motor operation. In some constructions, channels or grooves (such as those illustrated in FIGS. 10-13) are formed in the base portions of the teeth to further reduce cogging and/or ripple torque.

Referring back to FIG. 5, each tooth 100 cooperates with the adjacent teeth 100 to define a space or slot 115 between the teeth. Thus, each tooth 100 at least partially defines two slots 115. Each slot 115 may receive one or more sides of coils 70.

The back portion 95 is a substantially curved rectangular portion that provides support for the teeth 100 of the core segment 90 and provides a path for the magnetic field in the stator core. The back portion 95 also defines a male locking member 120 positioned at a first end 125 of the back portion 95 and a female locking portion 130 positioned at a second end 135 of the back portion 95. In the illustrated construction, the male locking member 120 includes a substantially semi-circular protrusion that extends along the full axial length of the core segment 90. The female locking portion 130 includes a substantially semi-circular channel that extends along the full axial length of the core segment 90 and is sized and shaped to receive the male locking member 120 of an adjacent core segment 90. As one of ordinary skill in the art will realize, many other shapes can be employed as male locking members 120 and female locking portions 130. For example, another construction employs a male locking member that includes a substantially circular portion that connects to the rectangular portion via a narrow neck portion. The female locking portion is similarly shaped such that when the components of adjacent core segments 90 interlock, the adjacent core segments 90 are inhibited from pulling away from one another. Still other constructions may employ other shapes such as, but are not limited to, dovetails, fir trees, T-shapes, L-shapes, and the like. It is also envisioned that one or more of the locking portions do not need to extend the full axial length of the core segment 90. Other constructions of the core portions do not include locking members and use for example fixtures for aligning the core portions and fastening them.

Core segments 90 can be manufactured by stacking a plurality of similar laminations on top of one another. FIG. 6 illustrates one possible lamination 135 that is suited for use in manufacturing the core segment 90 of FIG. 5 but that does not correspond to the final desired shape. The lamination 135 includes three teeth 140, a rectangular portion 145, and two axial alignment members 150. Each of the three teeth 140 is shaped to substantially match the profile of the teeth 100 of the core segment 90 of FIG. 5. The teeth 140 are spaced apart from one another a first distance 151 as measured from the centers of each tooth 140 near the end of the base. Of course other laminations may include fewer or more teeth 140 as long as the number of teeth 140 corresponds with the number of teeth 100 desired in the final core segment 90 to be manufactured from the laminations 135.

The rectangular portion 145 includes an inner surface 155 from which the three teeth 140 extend, a first short end 160 that defines a tab 165, a second short end 170 that defines a recess 175, and a long outer surface 180 opposite the inner surface 155. The tab 165 substantially matches the cross-sectional shape of the male locking member 120 and the recess 175 substantially matches the cross-section of the female locking portion 130. The inner surface 155 defines two inner slots 185 that are substantially V-shaped and with the opening towards the surface 155. The slots 185 are preferably positioned between the teeth 140 with other positions being possible. While the slots 185 are illustrated as being V-shaped, other shapes and arrangements are possible. In addition, while one slot 185 between each pair of teeth 140 is illustrated, other constructions may employ multiple slots 185 between each pair of teeth 140. Still other constructions may employ more or fewer slots 185 extending from the inner surface 155 and/or slots having different arrangements than those illustrated.

The outer surface 180 defines three outer slots 190 that are substantially aligned with the three teeth 140 disposed along the inner surface 155. The outer slots 190 include a narrow channel portion 195 and a circular bore portion 200. The narrow channel portion 195 extends from the outer surface 180 to the circular bore portion 200. As with the inner slots 185, other slot arrangements are possible to allow and enhance bending of the type shown in FIG. 5. In addition, there is no requirement that there be three slots 190 or that the slots 190 align with the teeth 140. As such, other constructions may employ more or fewer outer slots 190 and/or slots having different arrangements than those illustrated.

FIG. 6 illustrates the lamination 135 as including two axial alignment members 150. Each axial alignment member 150 is substantially rectangular and defines a protrusion 205 on one side of the lamination 135 and an indentation 210 on the opposite side of the lamination 135, as illustrated in FIG. 7. Each protrusion 205 is sized to fit within the indentation 210 of an adjacent lamination 135. Thus, as the laminations 135 are stacked on top of each other, the axial alignment members 150 assure the desired alignment. While the illustrated construction includes two rectangular axial alignment members 150, other constructions may use one or more than two alignment members 150. In addition, other shapes (e.g., circles, ovals, ellipses, triangles, polygonal shapes, irregular shapes, etc.) are also possible and contemplated by the present invention. In other constructions, fasteners of pins may pass through some or all of the laminations 135 to align them as desired. In still other constructions, no alignment members are employed. Rather, the laminations 135 are stacked in a die that maintains the desired alignment.

In most constructions, the laminations 135 are stamped from an electrical grade steel. A single die or a progressive die may be employed in the stamping process to achieve the desired shape and accuracy for the laminations 135. When a stamping process is employed, the axial alignment members 150 can be formed simultaneously with the lamination 135. Of course other constructions may form the axial alignment members 150 after the lamination 135 outline is completed. In still other constructions, the laminations 135 are cut using any common cutting process including, but not limited to water-jet cutting, EDM, laser cutting, plasma cutting, and the like. In yet other constructions, combined tools, known to those skilled in the art, are employed to stamp the laminations 135 and stack and fasten them using for alignment and axial inter-locking the members 150.

To manufacture the stator 60 of FIG. 2, a plurality of the laminations 135 of FIG. 6 are first formed. The laminations 135 are then stacked on top of one another until they reach a desired axial length. As the laminations 135 are stacked, the protrusions 205 of each of the laminations 135 (with the exception of one of the end laminations) engage the depressions 210 of the adjacent lamination 135 to assure the desired alignment. The use of laminations 135 improves motor performance and efficiency and allows for the simple variation of stator length simply by adding or removing laminations 135 from the stack. As discussed, the laminations 135 may be attached to one another using a fastener, clamp, adhesive, welding, keying, or cleating, and the like if desired.

Figure 8:
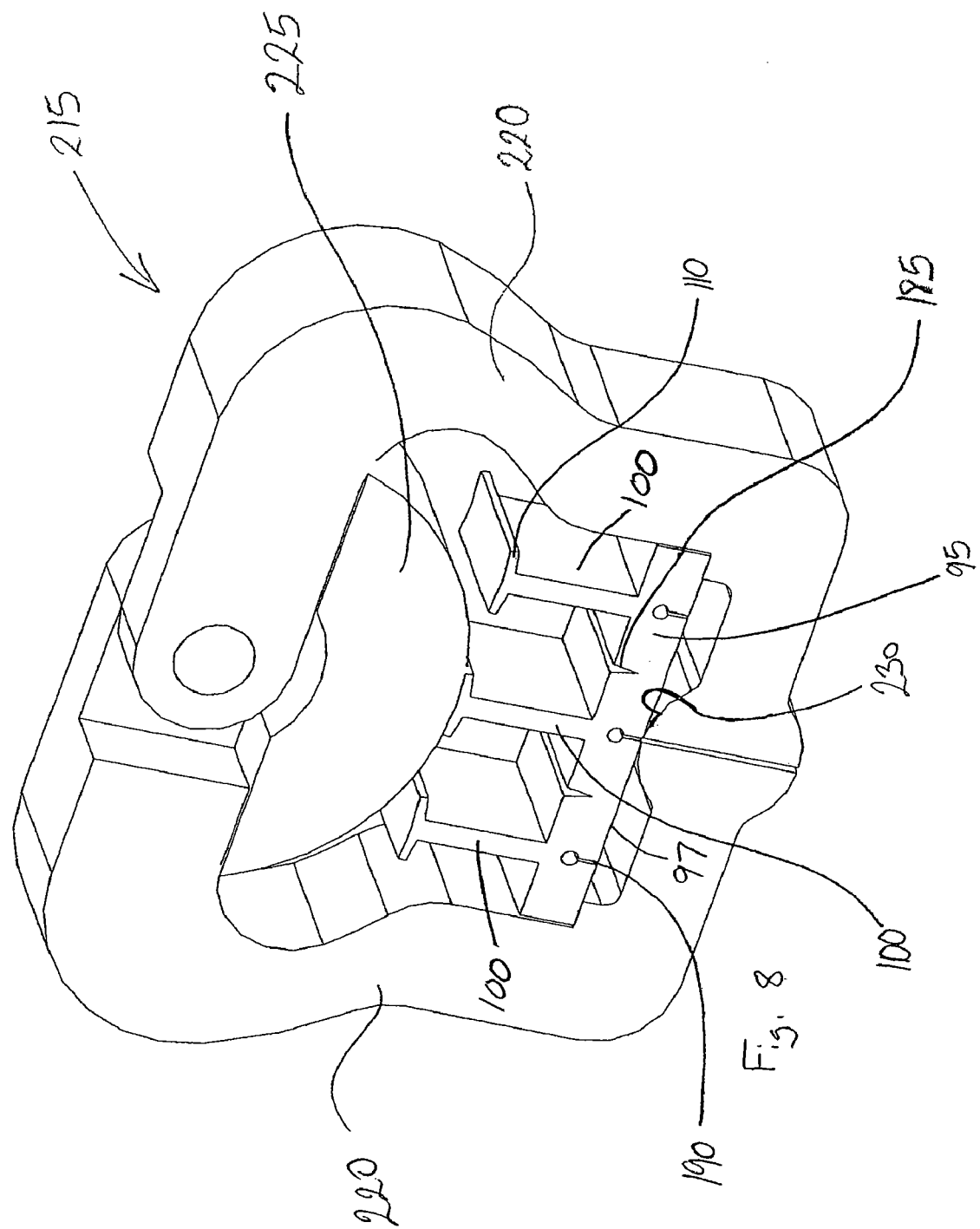
FIG. 8 is a perspective view of the stator segment of FIG. 5 positioned in one possible bending device before bending.
Figure 9:
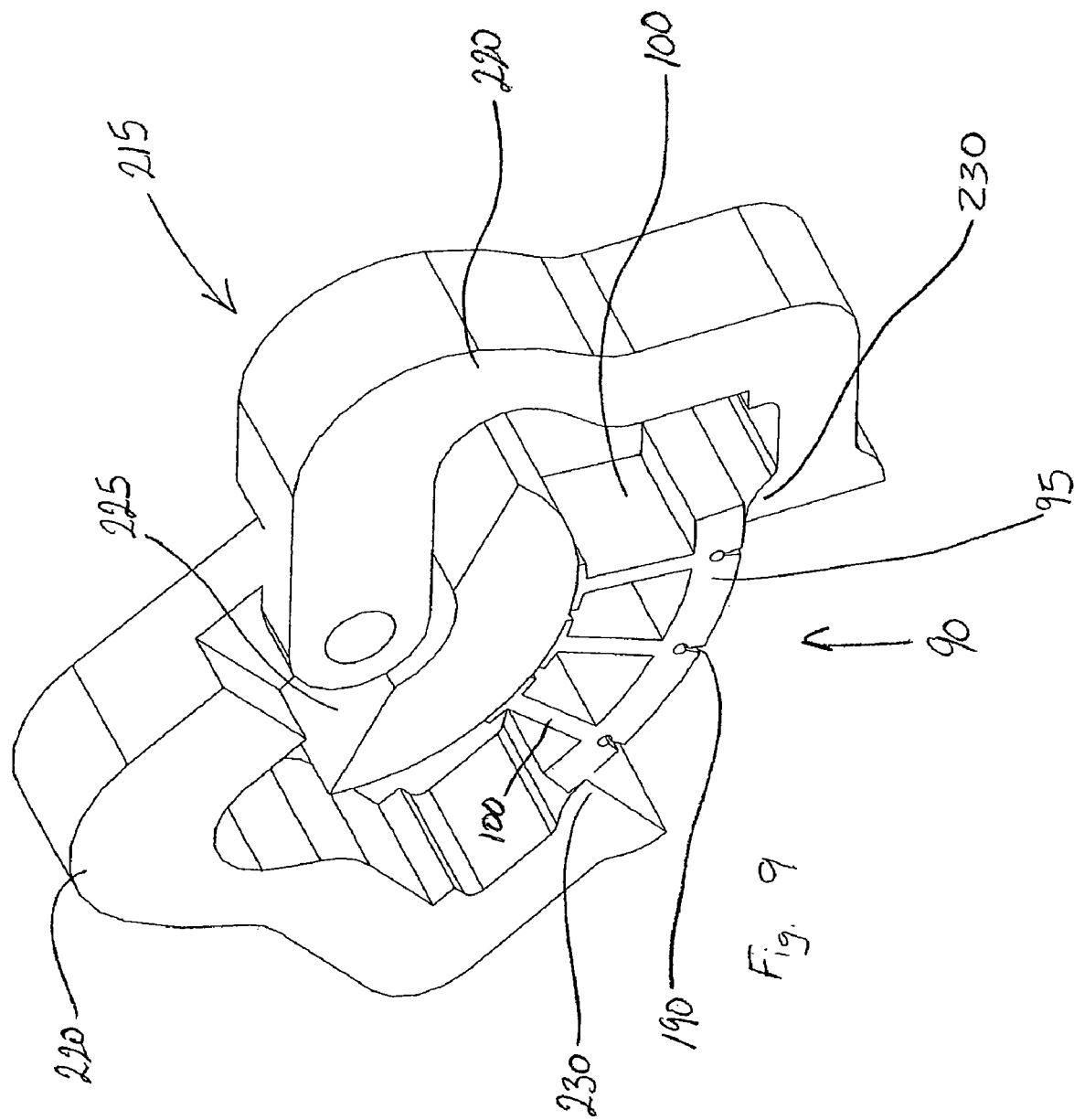
FIG. 9 is a perspective view of the stator segment of FIG. 5 positioned in one possible bending device following bending.

In some constructions, the completed stack of laminations 135 is bent, rolled, or otherwise deformed to produce the core segment 90 illustrated in FIG. 5. FIG. 8 illustrates one possible device 215 that functions to roll the stack of laminations 135 into the shape of the core segment 90. The device 215 includes two arm members 220 and a semi-circular guide 225. Each arm 220 includes a guide portion 230 that engages the outer surface 97 of the back portion 95 such that the base 110 of the center tooth 100 contacts the semi-circular guide 225. As illustrated in FIG. 9, as the arms 220 open, the guide portion 230 forces the outer most teeth 100 toward the semi-circular portion 225. As the core segment 90 bends, the inner slots 185 close and the outer slots 190 open. In addition, the space between the teeth 115 narrows such that adjacent teeth 100 are a second distance 231 from one another (shown in FIG. 5), the second distance 231 being smaller than the first distance 151 (shown in FIG. 6). The arrangement (including size, position, and quantity) of the slots 185 and 190 inhibits buckling near the inner surface 96 and tearing or cracking near the outer surface 97 as the core segment 90 is bent.

Generally, the semicircular portion 225 is slightly smaller than the desired final diameter to accommodate any spring back that may occur. Thus, FIGS. 8 and 9 illustrate one possible device 215 that may be employed to form the core segments 90. As one of ordinary skill in the art will realize, other different devices and methods exist that are capable of performing the same function.

Figure 3:
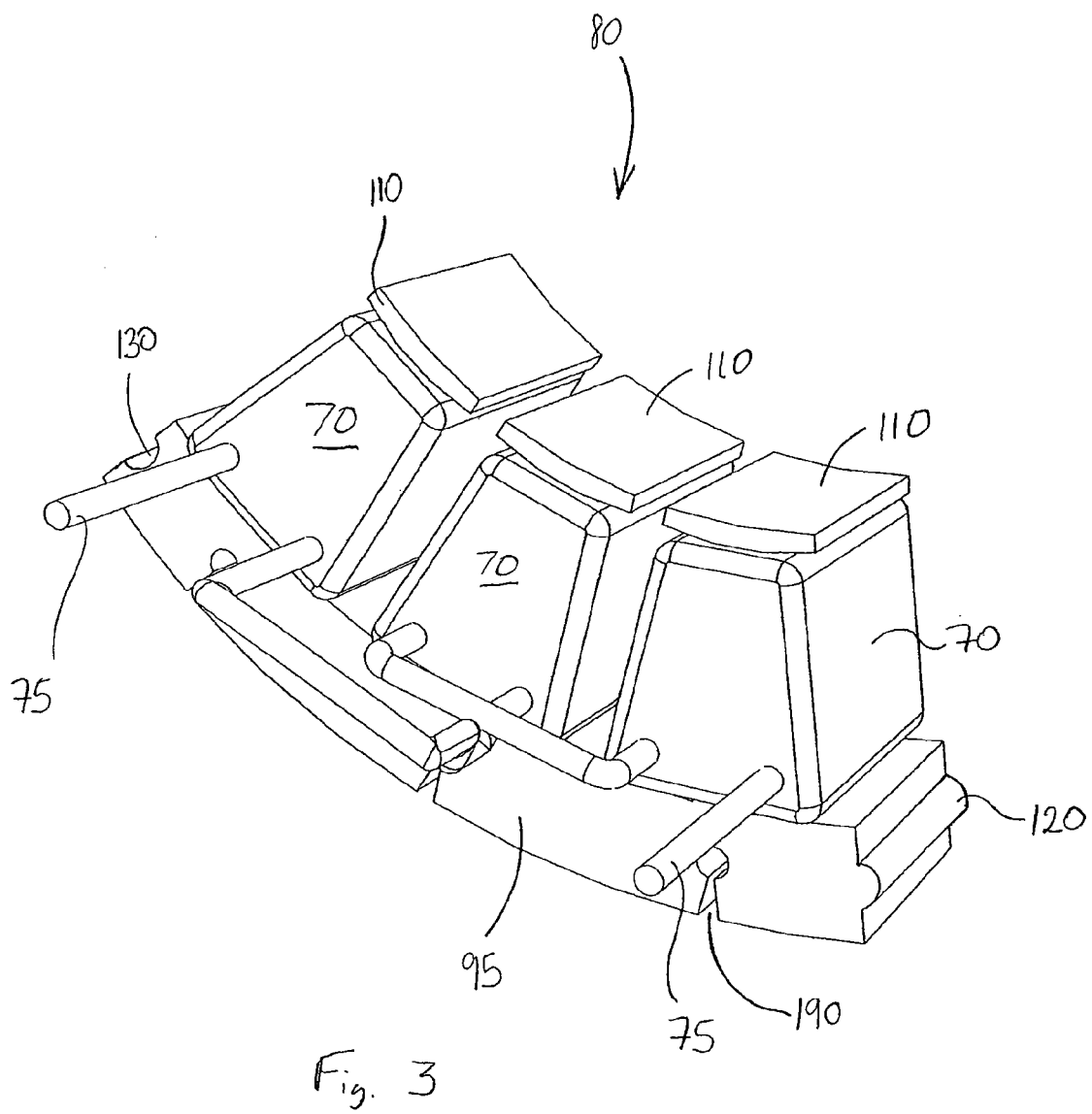
FIG. 3 is a perspective view of a stator portion (module)

If not attached to one another before bending, the laminations 135 of the now bent core segments 90 may be attached to one another using any common process (e.g., a fastener, clamp, adhesive, welding, keying, cleating, and the like). Coils 70 are then wound around the teeth 100 as required for the particular device being manufactured (e.g., single phase motor, multi-phase motor, single layer winding, double layer winding, etc.). After the windings are positioned as illustrated in FIG. 3, the stator portions 80 are arranged in a circle such that the male attachment member 120 engages the female attachment portion 130, thus interlocking the different stator portions 80 as illustrated in FIG. 2. The leads 75 from each coil 70 are then connected as required to complete the stator 60 and allow for proper operation of the motor 10.

Some constructions may also injection mold plastic or another material around the stator 60 to seal and insulate the stator 60, to provide support for the assembled components (see for example FIG. 19), and/or to reduce vibration and noise. In addition to common plastic materials, materials with magnetic properties, such as a ferromagnetic resin, can be used to reduce mmf (magnetomotive force) drop, dampen vibrations, and/or reduce noise.

Before proceeding, it should be noted that other constructions may position coils 70 around the teeth 100 before the core segment 90 is bent as shown in FIG. 3a. Such a procedure allows for easier access between the teeth 100 and a higher slot fill factor and may be advantageous for some motors. The stator segment 90 is then bent as discussed with regard to the construction of FIG. 3. As such, the invention should not be limited to the order of construction illustrated and discussed herein.

Figure 10:
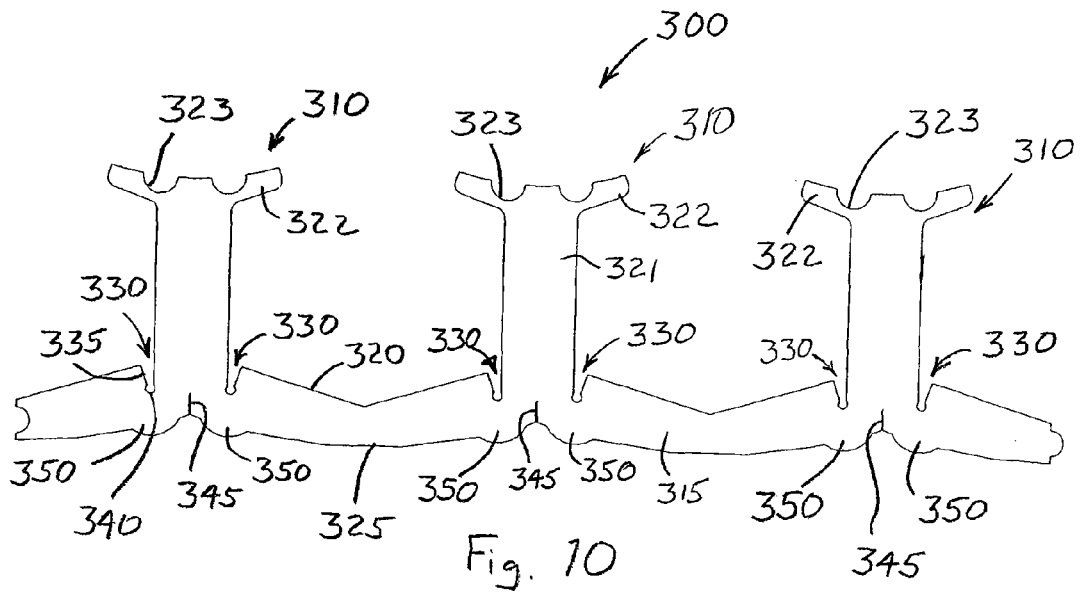
FIG. 10 is a front view of another lamination suited for use in producing a core segment.

As mentioned, other constructions may employ differently shaped laminations to form core segments like the core segment 90. FIG. 10 illustrates a lamination 300 that is suited for manufacturing a core segment 305 similar to that illustrated in FIG. 5. The lamination 300 of FIG. 10 includes three teeth 310 and a back portion 315 that defines an inner surface 320 and an outer surface 325. Teeth 310 include a coil-receiving portion 321 and a base 322 positioned at the innermost end of the coil-receiving portion 321. The base 322 also includes two grooves 323 at the inner most surface.

The back portion 315 is thickest adjacent each tooth 310 and narrows to a narrow point between two adjacent teeth 310. Inner slots 330 are formed on both sides of, and immediately adjacent to the teeth 310. The inner slots 330 include a substantially V-shaped portion 335 that ends in a circular portion 340 at the vertex of the V-shaped portion 335. Outer slots 345 extend inwardly from the outer surface 325 and are substantially aligned with the teeth 310. The outer slots 345 are generally narrow slits that are radiused at their ends. As with the inner slots 185 and outer slots 190 of FIGS. 4-6, the slots 330 and 345 of FIGS. 10 and 11 can be shaped differently than illustrated or positioned differently. In addition, more or fewer slots 330 and 345 may be employed as necessary. For example, a stator that includes more stator portions 80 than illustrated herein may require fewer slots 185, 190, 330, 345 than a stator with more stator portions, as each stator portion 80 is bent to a larger curvature arc. As such, the position, shape, and quantity of the slots 185, 190, 330, or 345 are largely a manufacturing function and can vary.

The outer surface 325 of the back portion 315 of FIG. 10 also includes a plurality of bumps 350 that extend outwardly. The bumps 350 are substantially arcuate and are generally aligned with the inner slots 330. The positioning of the bumps 350 provides additional material adjacent the inner slots 330, thus improving the strength of the back portion 315 in these areas. In addition, the additional material provides a larger flow path for magnetic flux, thereby improving motor performance and efficiency. In constructions that injection mold plastic around the completed stator, the bumps 350 can be used to support pins that further aid in the injection molding process.

Figure 11:
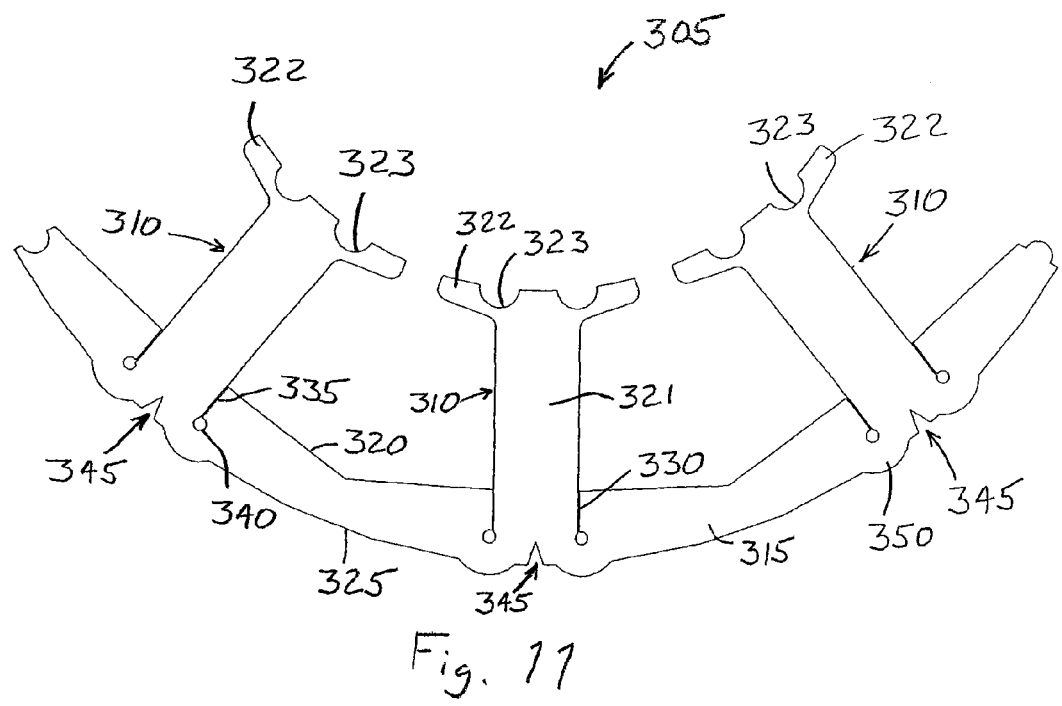
FIG. 11 is a front view of a core segment, without coils, produced using laminations of FIG. 10 following bending.

FIG. 11 illustrates the core segment 305 manufactured from the lamination 300 of FIG. 10. The laminations 300 of FIG. 10 are stacked and can be bent in much the same manner as was discussed with regard to FIGS. 5-6 and 8-9. When bent into the final shape, adjacent teeth 310 move closer to one another, the inner slots 330 move toward a closed position, and the outer slots 345 open. As with the prior construction, coils 70, shown in FIG. 3, can be wound around the teeth 310 before or after the core segment 305 is bent.

Figure 12:
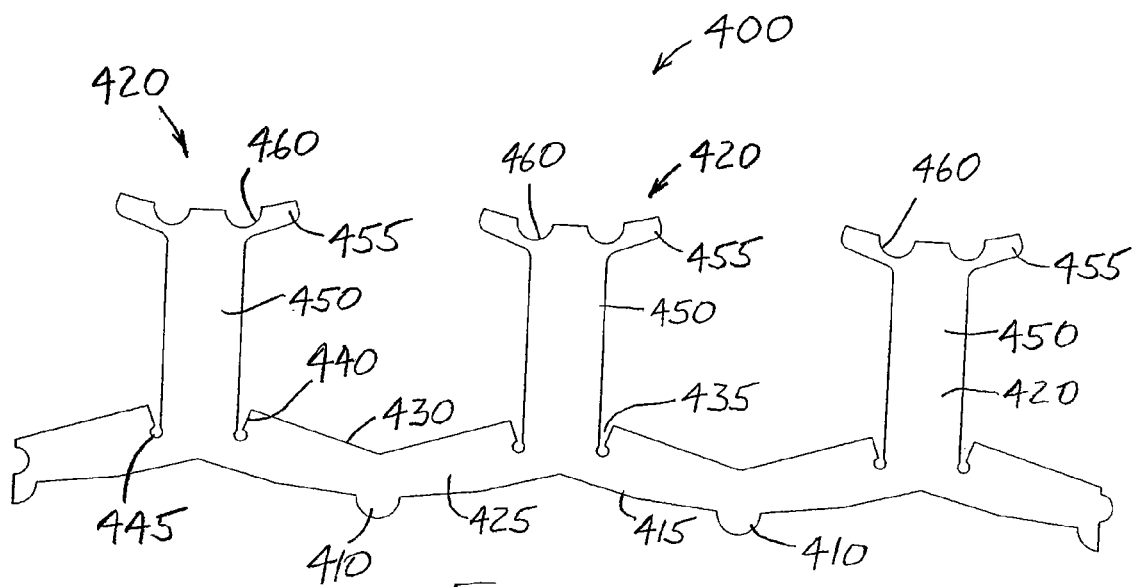
FIG. 12 is a front view of another lamination suited for use in producing a core segment.

FIG. 12 illustrates yet another arrangement for a lamination 400 that is suitable for use in construction of a core segment 405. The lamination 400 of FIG. 12 is similar to the lamination 300 of FIG. 10, but lamination 400 does not include outer slots 345. In addition, the lamination 400 does not include bumps opposite the inner slots, but rather includes bumps 410 on an outer surface 415 disposed substantially between teeth 420. The bumps 410 provide additional thickness to a back portion 425 such that the central part between adjacent teeth 420 is not the narrowest part of the back portion 425. An inner surface 430 defines inner slots 435 on both sides of, and immediately adjacent the teeth 420. The inner slots 435 include a substantially V-shaped portion 440 that ends in a circular portion 345 at the vertex of the V-shaped portion 440. Each tooth 420 includes a coil-receiving portion 450 and a base 455 positioned at the innermost end of the coil-receiving portion 450. The base 455 also includes two grooves 460 at the inner most surface. In constructions that injection mold plastic around the completed stator, the bumps 410 can be used to support pins that further aid in the injection molding process.

Figure 13:
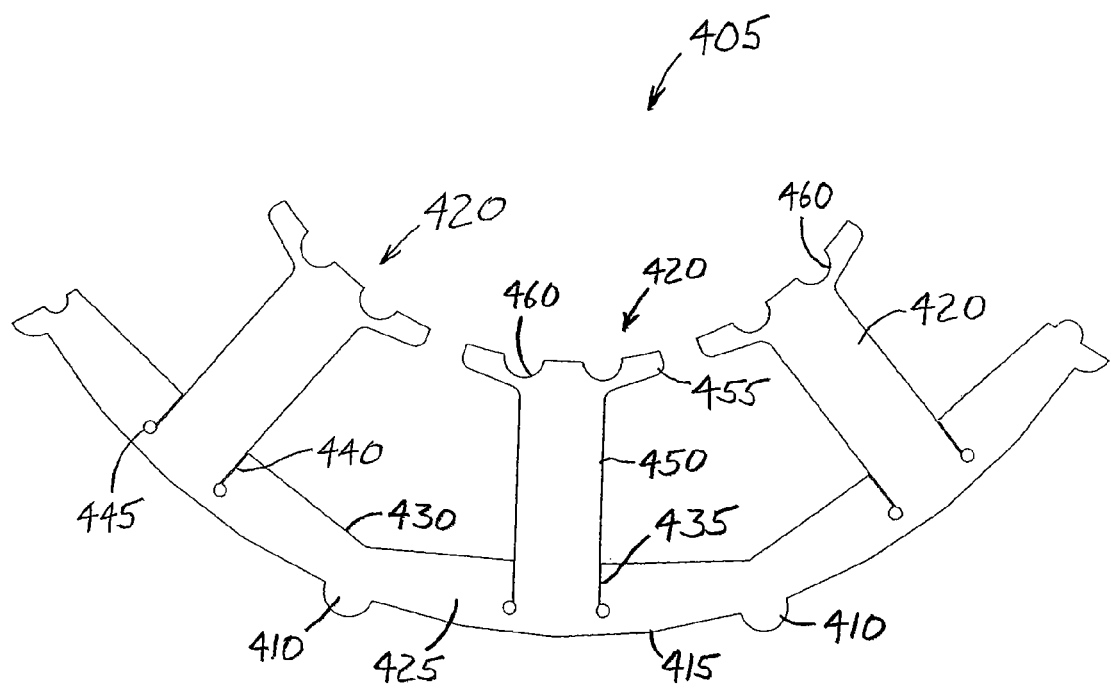
FIG. 13 is a front view of a core segment, without coils, produced using laminations of FIG. 12 following bending.

FIG. 13 illustrates the core segment 405 formed using the lamination 400 of FIG. 12 in a bent condition. As can be seen, the core segment 405 manufactured using the laminations 400 bends in much the same manner as the core segment 305 illustrated in FIG. 11.

In another construction, illustrated in FIGS. 14-17, a lamination 500 includes a center tooth 505 having a substantially rectangular tooth profile and two side teeth 510, 511 having a substantially L-shaped tooth profile. Before proceeding, it should be noted that the use of the term "center tooth" should not be read as requiring the tooth to be centered on the lamination. Rather, the term should be interpreted as requiring only that the center tooth 505 be positioned between the two side teeth 510, 511. A back portion 515 includes an outer surface 520 and an inner surface 525 that supports the three teeth 505, 510, 511 such that the center tooth 505 is approximately centered on the back portion 515, the first of the side teeth 510 is positioned on a first side of the back portion 515 and includes a tooth tip 530 that extends toward the center tooth 505, and the second of the side teeth 511 is positioned on a second side opposite the first side of the back portion 515 and includes a tooth tip 535 that extends toward the center tooth 505. The back portion 515 defines two small inner slots 540 and two large inner slots 545. The small inner slots 540 are positioned adjacent to the center tooth 505 and include a substantially V-shaped portion 550 with a circular aperture 555 at the vertex of the V-shaped portion 550. The large inner slots 545 are similar to the small inner slots 540 in that they include a V-shaped portion 560 and a circular portion 565 at the vertex of the V-shaped portion 560. However, the large inner slots 545 are larger (i.e., extend further into the back portion 515) than the small inner slots 540. The large inner slots 545 are disposed in the spaces between the center tooth 505 and the two side teeth 510 and 511.

The outer surface 520 of the back portion 515 includes an outer slot 570 positioned opposite the center tooth 505. The outer slot 570 includes two substantially parallel edges 575 that terminate at a circular aperture 580. The outer surface 520 also defines two small notches 585 positioned opposite the large inner slots 545. In addition to the notches 585, the laminations 500 of FIG. 14, as well as any other laminations discussed herein, may include one or more axial alignment members 150 similar to those discussed with regard to FIG. 6.

The back portion 515 may also include locking members such as a locking tab 590 and a locking aperture 595. Like prior constructions, the laminations 500 are stacked to define a core segment 600 illustrated in FIG. 15. When stacked, the locking tabs 590 cooperate to define a male locking member 605 and the locking apertures 595 cooperate to define a female locking portion 610.

Figure 14:
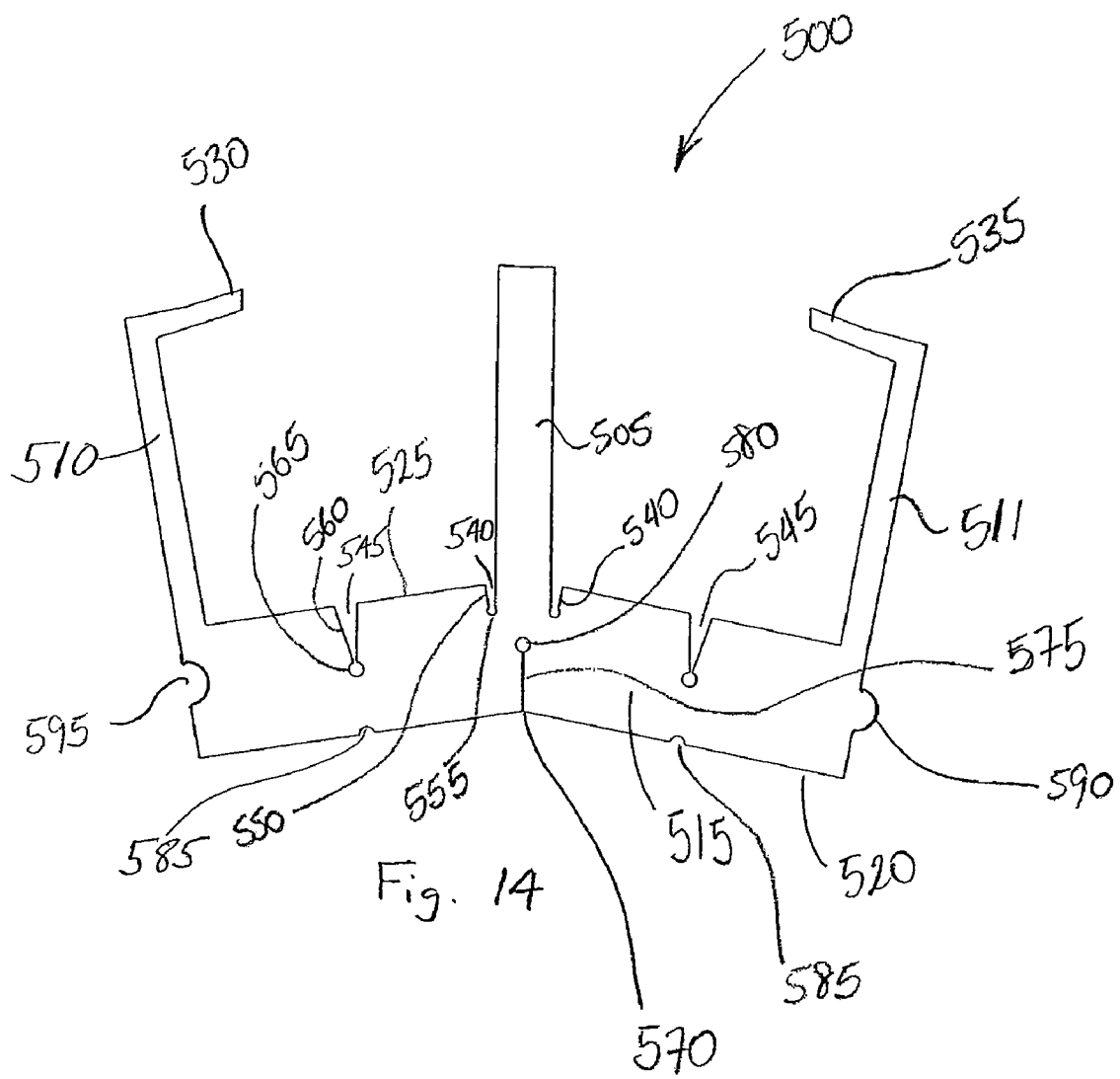
FIG. 14 is a front view of another lamination suited for use in producing a core segment.
Figure 14A:
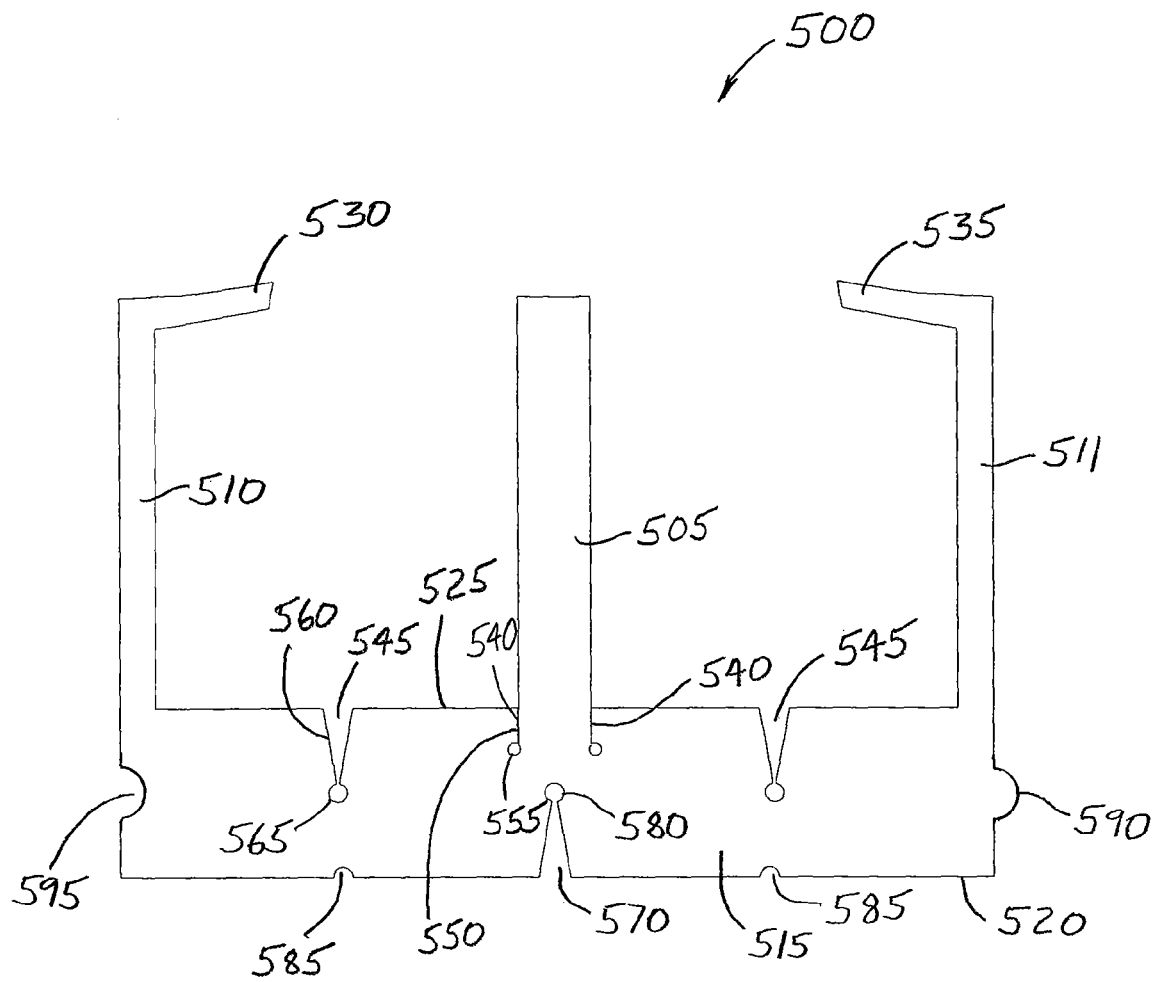
FIG. 14a is a front view of the lamination of FIG. 14 in a straight configuration.
Figure 21:
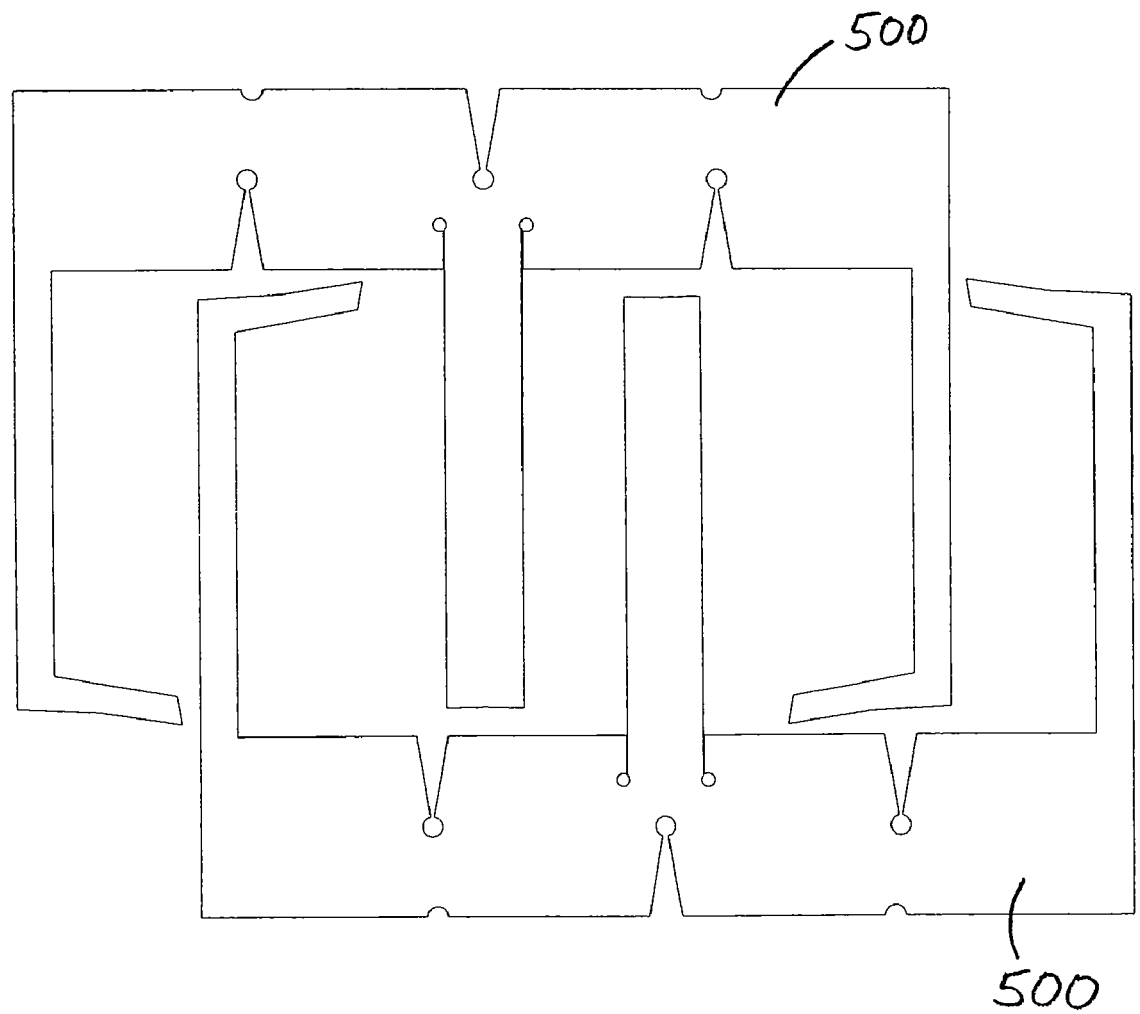
FIG. 21 is a front view of two stator laminations of FIG. 14 arranged for forming from a sheet of material.

In preferred constructions, the laminations 500 of FIG. 14 are punched from a sheet or strip of material. In one construction, the laminations 500 are punched in the arrangement illustrated in FIG. 14a. When oriented in this manner, the different laminations 500 can be nested within one another, as illustrated in FIG. 21, thus reducing the amount of material wasted. The laminations 500 are then stacked and then bent outward such that they appear as illustrated in FIG. 14. In other constructions, the laminations 500 are bent first and then stacked. After the laminations 500, or core segment 600, are bent outward, they are in a position that allows for the easy installation of a winding 70. After the winding 70 is installed, the core segment 600 can be bent to the shape illustrated in FIG. 15.

The core segment 600 is then bent to the desired diameter and mated with other core segments 600 to define a core similar to the core 65 illustrated in FIG. 4. As the core segment 600 is bent, the small V-shaped slots 540 and the large V-shaped slots 545 move toward a closed position. Thus, the V-shaped slots 540 and 545 are sized based at least partially on the desired final diameter of the core. The outer slot 570 and the two small notches 585 open during the bending process to inhibit cracking and reduce stress.

Figure 15:
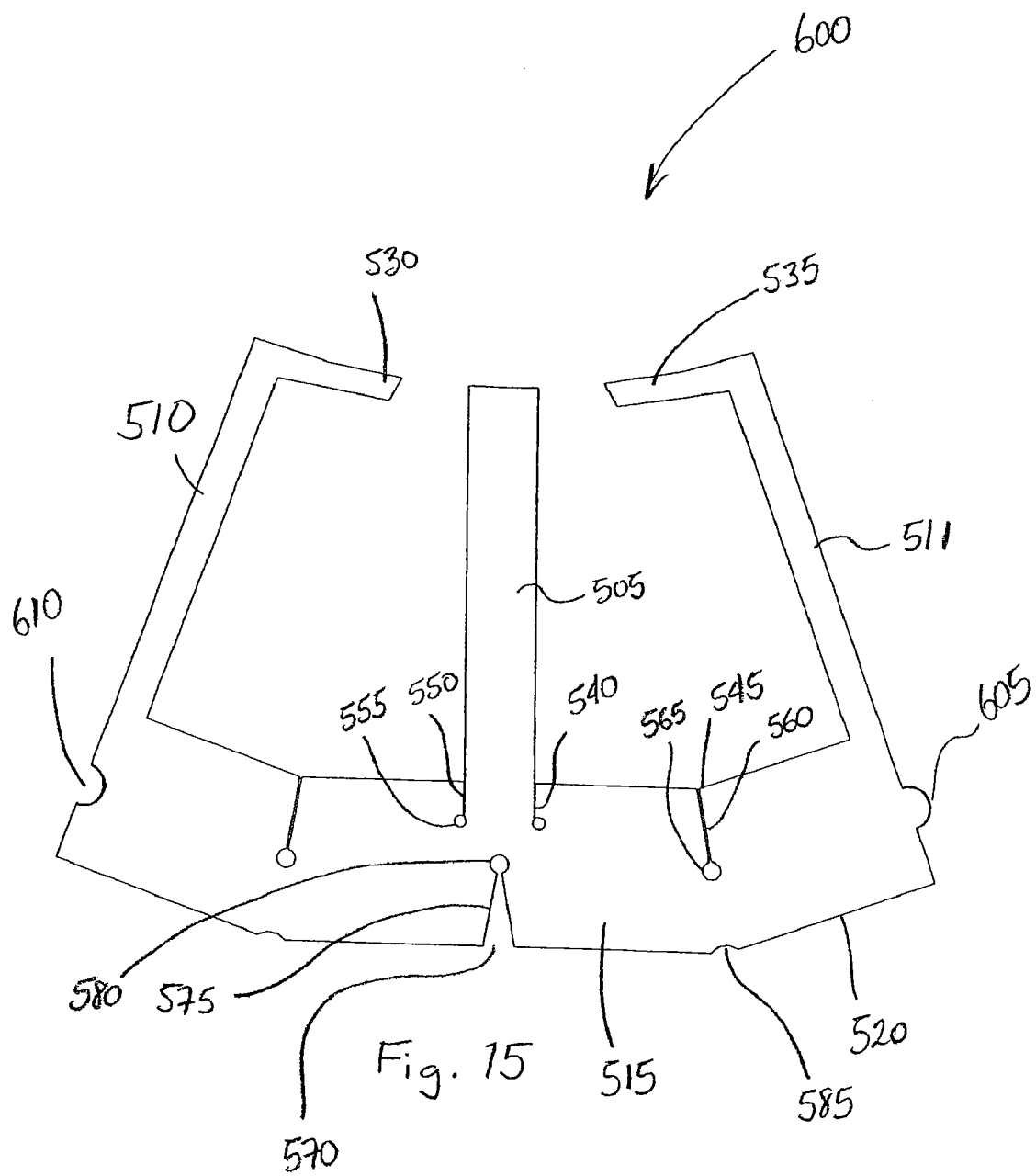
FIG. 15 is a front view of a core segment, without coils, produced using laminations of FIG. 14 following bending.
Figure 16:
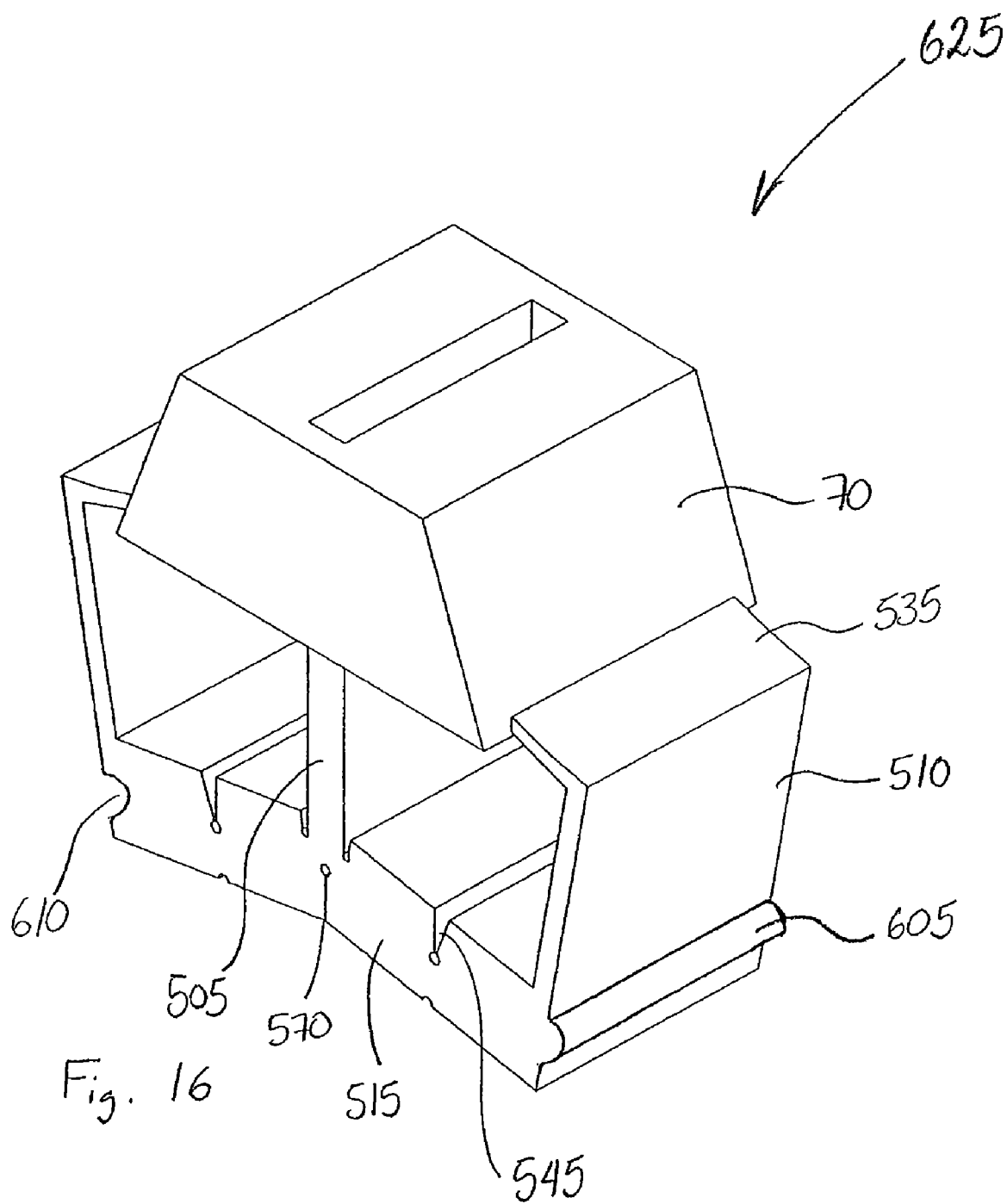
FIG. 16 is a perspective view of the core segment of FIG. 15 before inward bending with a coil partially installed.

The core segment 600 illustrated in FIG. 15 is well suited for use in a stator that includes coils 70 only around teeth 505. In such a construction, the coil 70 can be manufactured separate from the core segment 600 and installed before the core segment 600 is bent. FIG. 16 illustrates a coil 70 (schematically illustrated as a block) sliding over the center tooth 505 to form a stator portion 625. With the stator portion 625 in the unbent position, the space between the side teeth 510 and the center tooth 505 is large enough to allow for the passage of the completed coil 70, thus eliminating the need for any on-tooth winding.

Figure 17:
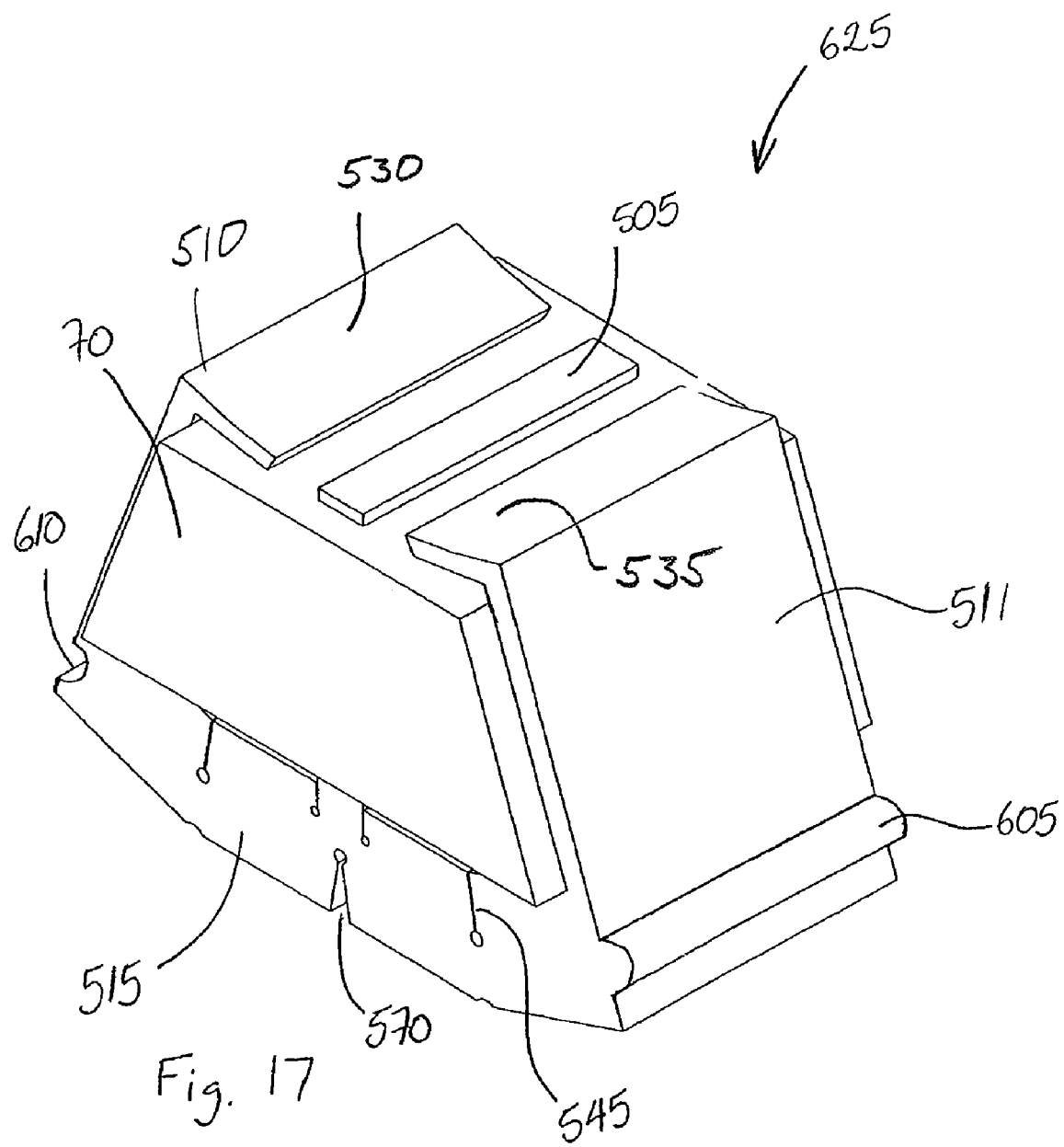
FIG. 17 is a perspective view of the core segment of FIG. 15 with a coil installed following bending.

The stator portion 625 is then bent as illustrated in FIG. 17 such that the tooth tips 530, 535 of the side teeth 510, 511 cover a portion of the coil 70 and inhibit unwanted movement of the coil 70 as well as enhance the electromagnetic performance of the construction. Of course, other constructions could employ other tooth shapes if desired. However, constructions that employ non-rectangular center teeth will generally need coils 70 wound directly onto the tooth.

Figure 18:
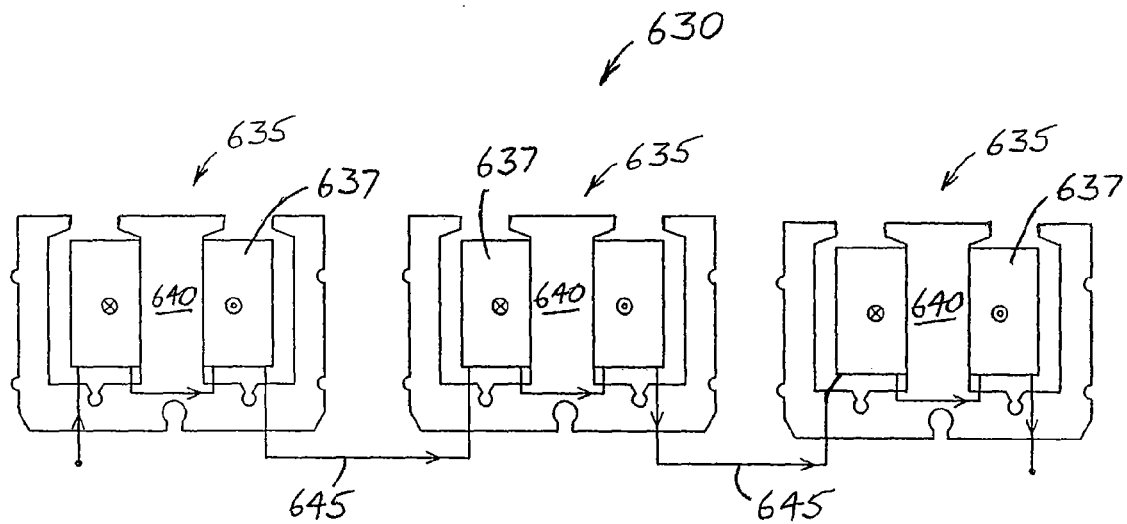
FIG. 18 is a schematic illustration of two core segments similar to those of FIG. 17 before bending and showing the coil winding path.

FIG. 18 illustrates a wound phase 630 that includes stator portions 635 similar to the stator portion 625 illustrated in FIG. 17 with the exception that a central tooth 640 of each stator portion 635 is not rectangular. The wound phase 630 includes three separate stator portions 635 that each receives a coil 637. The wound phase 630 includes conductors 645 that extend between the adjacent stator portions 635 to complete the circuit. Thus, the arrangement of FIG. 18 can be wound using a single continuous conductor.

Figure 19:
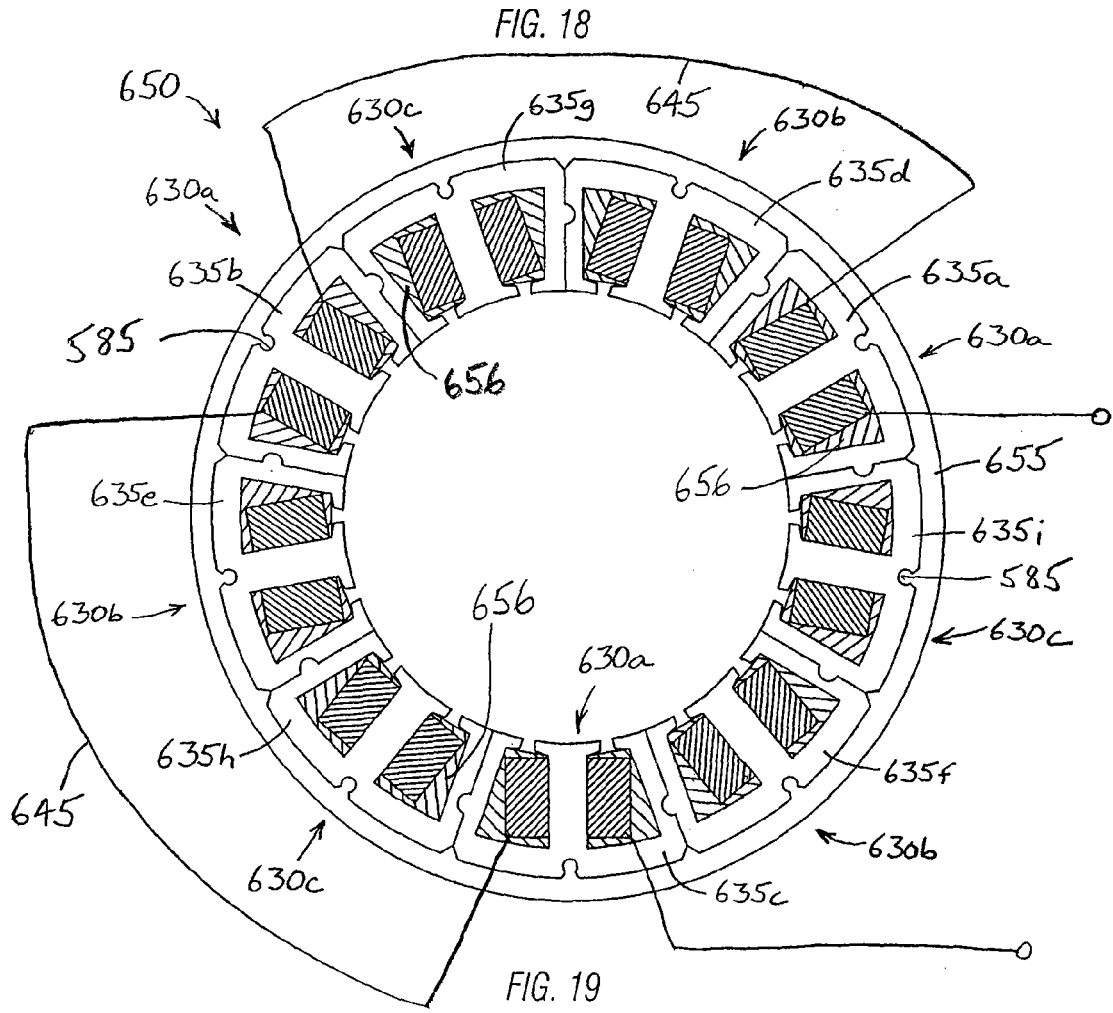
FIG. 19 is a schematic view of a stator including a plurality of core segments similar to those of FIG. 17.

To manufacture a three-phase stator 650 as illustrated in FIG. 19, nine stator portions 635a-635i are arranged to define three wound phases 630a, 630b, 630c as illustrated in FIG. 18. Initially, the stator portions 635 of the three wound phases 630 are bent to the proper diameter as discussed. As illustrated in FIG. 19, the first stator portion 635d of the second wound phase 630b is positioned adjacent the first stator portion 635a of the first wound phase 630a. The first stator portion 635g of the third wound phase 630c is then positioned adjacent the first stator portion 635d of the second wound phase 630b. This sequence is repeated until all of the stator portions 635a-635i are positioned. The long wires 645 (only wound phase 630a shown) extend between adjacent stator portions 635 of a wound phase 630 to maintain the proper electrical connection and eliminate the need to break and reconnect wires within the stator 650. Once the stator portions 635 are positioned, a layer of plastic 655 or another material may be formed (e.g., injection molded) around the components to hold them in place and substantially seal the stator 650. The plastic may also be formed in the slots (plastic numbered 656 in FIG. 19) in the spaces between the coils and the core in order to further enhance the mechanical, thermal and electromagnetic performance of the stator. The illustrated construction is a three-phase stator with 18-slots and a single layer winding with coils wound around ever other tooth. Such a stator is suitable to be used, for example, in conjunction with a 12-pole magnetic rotor to operate as a brushless PM motor. Of course other arrangements could be employed to provide fewer or more poles or fewer phases if desired. For example, in a single-phase construction the total number of coils employed would be an even number and the coils would be interconnected with a single continuous wire.

Figure 20:
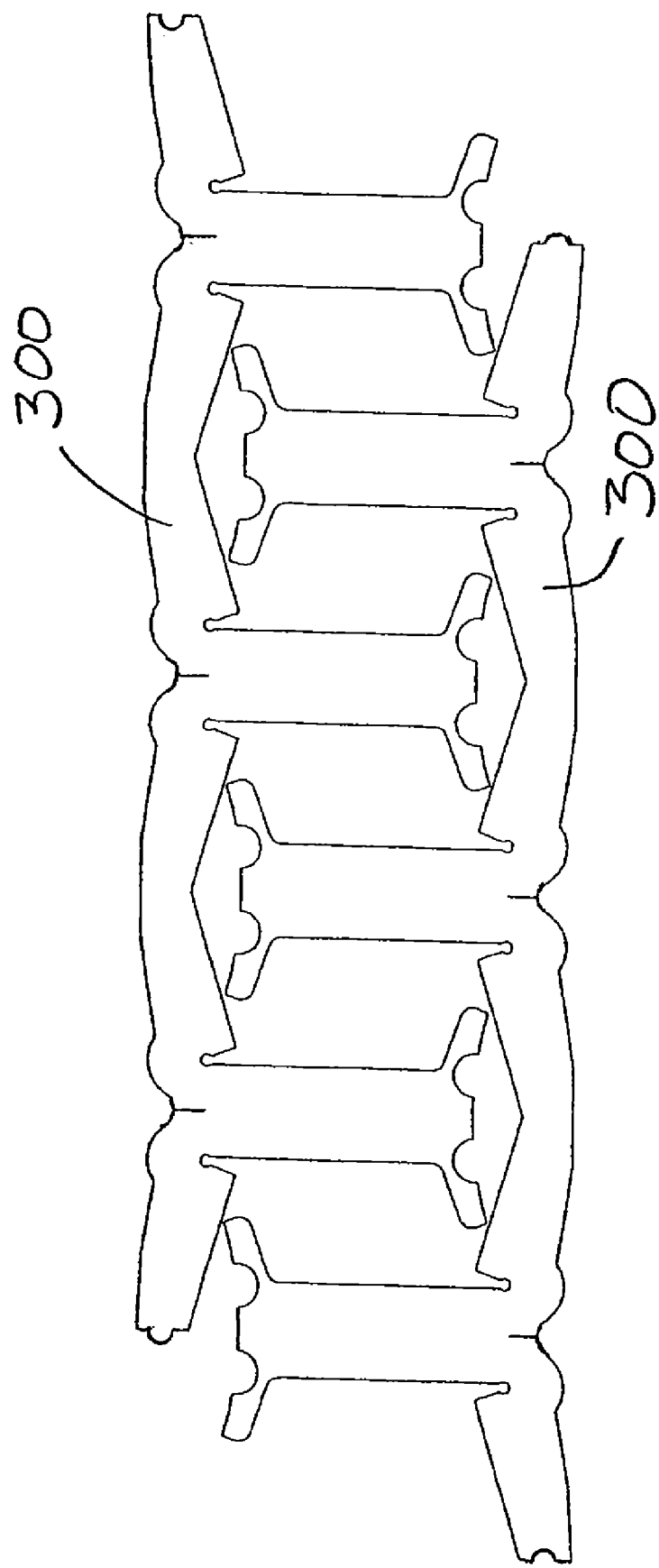
FIG. 20 is a front view of two stator laminations of FIG. 10 arranged for forming from a sheet of material.

The illustrated core segments may allow for a reduction in the amount of material required to manufacture a predetermined quantity of laminations. Rather than forming laminations in a complete circular pattern, the present arrangement allows for multiple laminations to be arranged such that the teeth of the laminations are interdigitated with one another as illustrated in FIGS. 20 and 21, thereby reducing the amount of scrap material produced during manufacture. FIG. 20 illustrates an arrangement for laminations 300 and FIG. 21 illustrates a similar arrangement for laminations 500. Of course, other constructions could use arrangements of laminations that are formed in their final shape, and thus require no bending. However, these arrangements will generally produce more material waste than will the use of substantially straight laminations that are later bent to a final curved shape.

Figure 29:
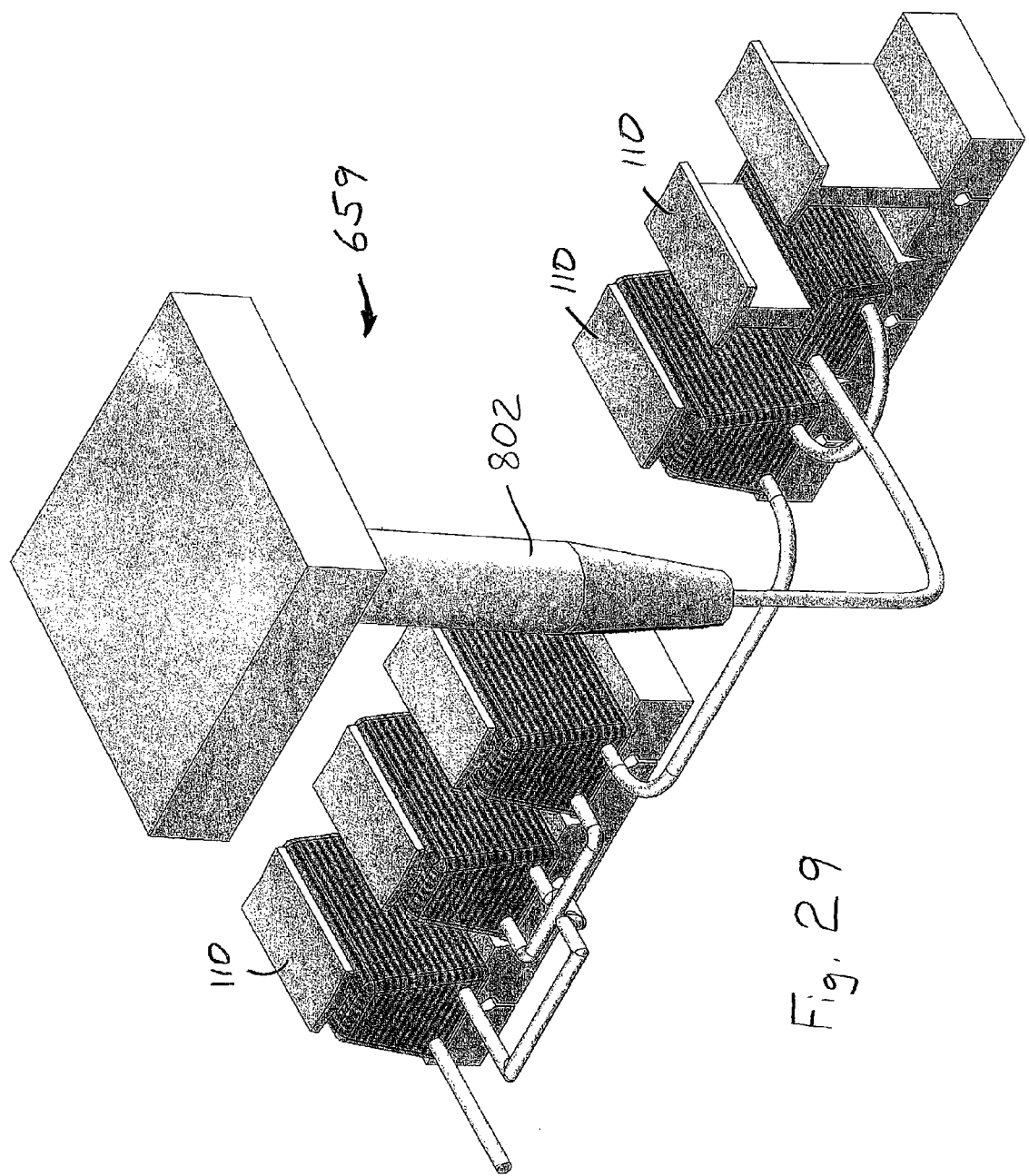
FIG. 29 is a perspective view of a winder in the process of winding the stator modules of FIG. 28.

In some constructions, coils 70 are wound onto the teeth 100, 310, 420, 505, prior to bending using a winder 659 similar to that shown in FIG. 29. The increased space between the teeth 100, 310, 420, 505, at this point in manufacturing, allows for the use of simpler equipment such as bobbin winders (with or without movable heads), rather than more expensive needle winders. In addition, a denser winding can be positioned within the enlarged space, thereby increasing the fill factor of the motor. The increased fill factor produces a higher specific torque output and/or improves motor efficiency.

In addition, constructions that position more than one tooth on each core segment can improve mechanical strength and roundness in comparison to prior-art constructions that employ only a single tooth in each core segment. In addition, the reduced number of discontinuities in the back portion (at the connection between adjacent core segments or stator portions) reduces the number of parts and thus the time required to assemble the motor 10 and also provides a better magnetic flux path. The flux path in the referred core segments can reduce the mmf drop of the back portion and increase the motor efficiency.

In some constructions, each coil 70 of a stator portion is interconnected with the other coils 70 of that stator portion to at least partially define a phase winding. Such an arrangement allows for the use of a single continuous conductor to form each coil in a given stator portion. This reduces the number of breaks and connections in the motor, thereby improving motor performance, manufacturability and reliability.

Figure 22:
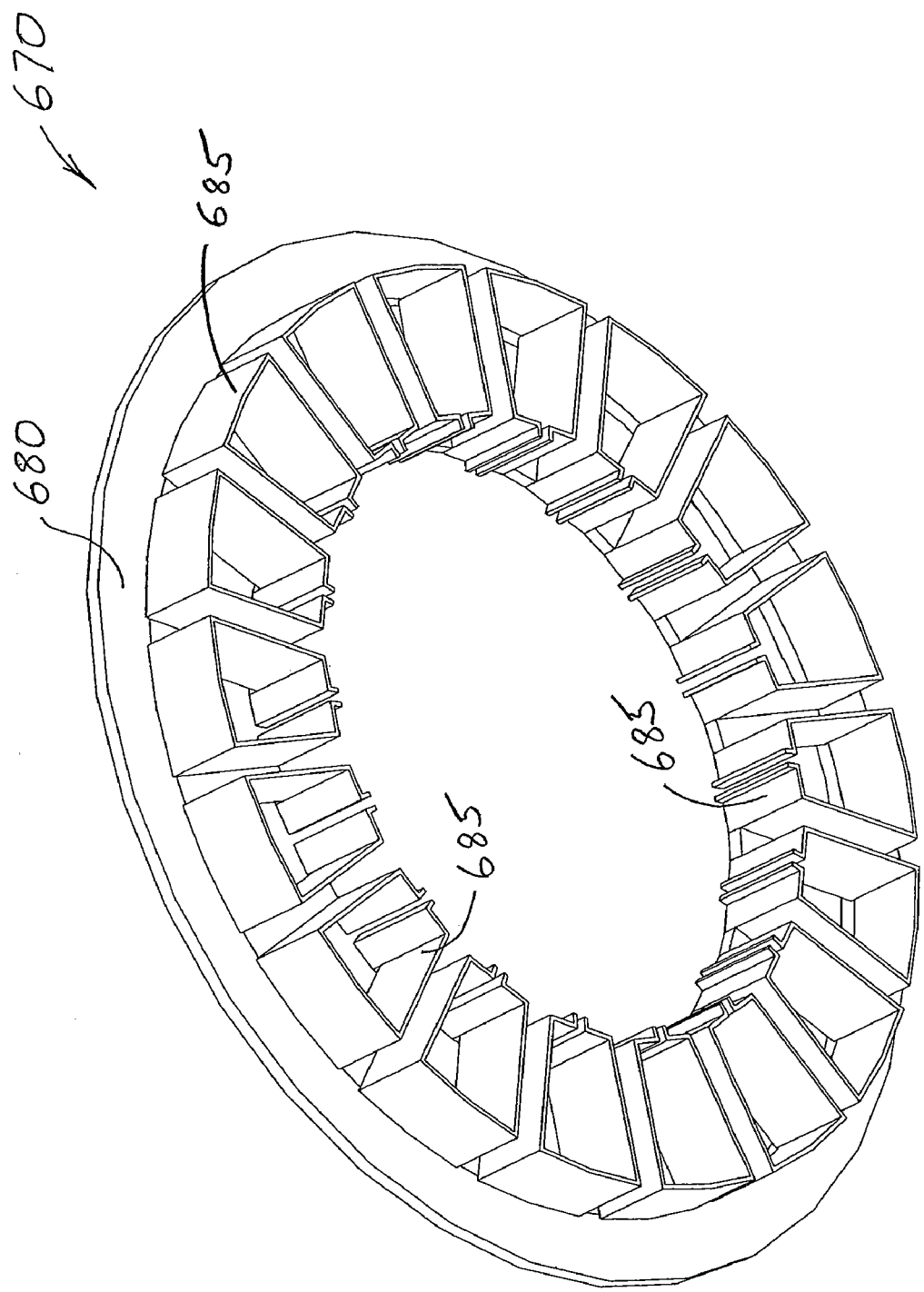
FIG. 22 is a perspective view of a form including an end insulator portion and slot insulating portions.
Figure 23:
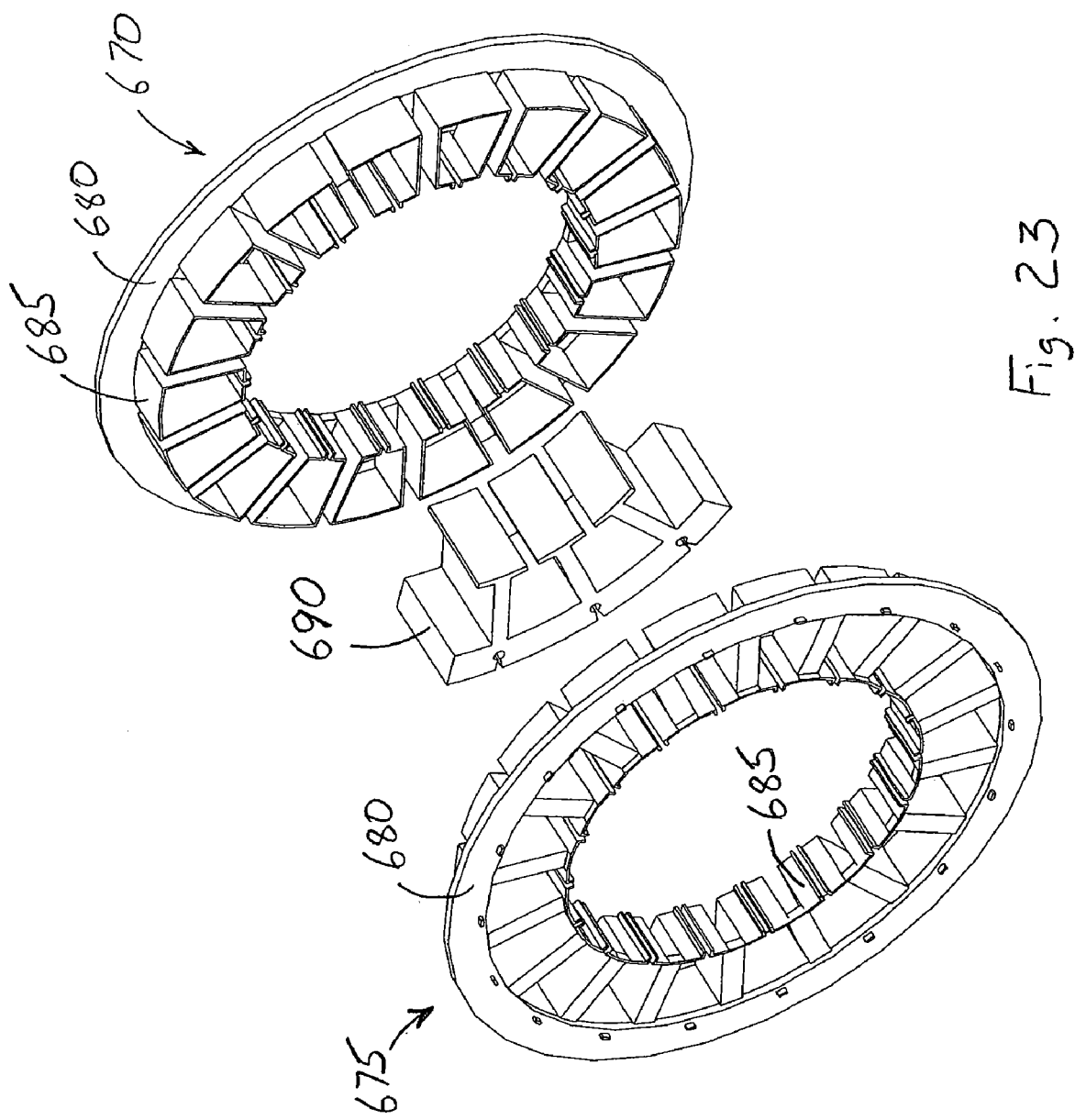
FIG. 23 is an exploded perspective view including a portion of a stator core and two forms of FIG. 22.
Figure 24:
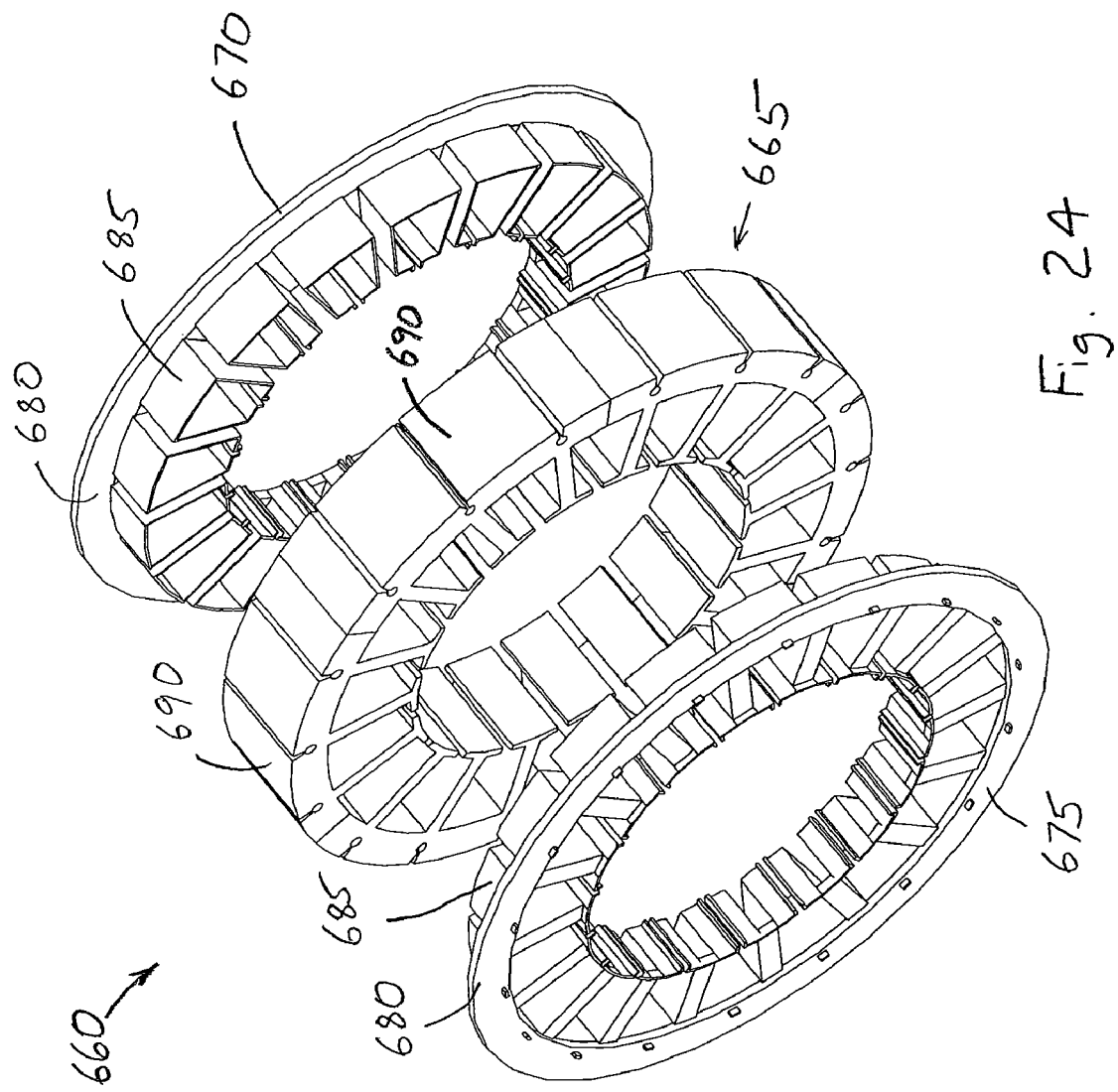
FIG. 24 is an exploded perspective view including an unwound stator core and two forms of FIG. 22.

As discussed with regard to FIGS. 6 and 7, some stator constructions do not require alignment members to align the adjacent laminations. One such stator 660 is illustrated in FIG. 24 (with windings omitted for clarity). The stator 660 includes a core 665, a first form 670, and a second form 675. FIG. 22 illustrates the first form as being shaped to receive the core 665. The form 670 includes an annular end insulator portion 680 and a plurality of slot insulator portions 685. Laminations, either partial as shown in FIG. 23, or complete circular laminations as shown in FIG. 24 fit within the form 670 such that the back portion of the lamination rests on the end insulator portion 680 and the tooth portions fit between the slot portions 685. Thus, the form 670 holds the laminations in the proper orientation and no alignment members are required. Of course, constructions that also employ alignment members could be employed if desired. In preferred constructions, the first form 670 is manufactured from a dielectric material such as injection molded plastic, with other electrically insulating materials also being suitable for use.

It should also be noted that while the core 665 has been described as being formed from a plurality of stacked laminations, other constructions may employ other methods or materials to form the core 665. For example, some constructions use a powdered metal or a soft magnetic composite to form the entire core 665 or to form pieces that are then fit and held together by the form to define the core 665. As such, the invention should not be limited to cores 665 that employ laminations.

To assemble the stator 660 using the form 670 of FIG. 22, laminations are stacked in each of the first form 670 and the second form 675. In most constructions, the first form 670 and the second form 675 are similar to one another. Of course, other constructions could employ forms that are different from one another and/or are different from the forms 670, 675 illustrated herein. Generally, the slot portions 685 of each form 670, 675 have a length that is equal to about one-half the core length of the stator 660. Of course, other constructions could vary the slot length of each form 670, 675 so long as the two lengths add up to a length approximately equal to the core length. Once the two forms 670, 675 are filled, they are attached to one another (e.g., welded, glued using an adhesive, fasteners, etc.). In some constructions, fasteners pass through the forms 670, 675 and the laminations to hold the components together. In other constructions, adhesives or other attachment methods are employed. Once attached, the coils of the core 660 can be wound as desired. In some constructions, the attachment system used to attach the forms 670, 675 and core 665 is temporary. For example, one construction uses bolts that pass through the forms 670, 675 and core 665. After the coils are wound, the fasteners are removed and the windings themselves hold the various components together, or other supplementary means of holding, such as a welding the stator portions, a stator housing (frame) or plastic overmolding, are employed.

In other constructions, core segments 690 (FIG. 23), or an entire core 665 (FIG. 24) is first assembled and then inserted into one of the forms 670. The second form 675 is then positioned over the portion of the core 665 that extends above the first form 670 to complete the unwound stator 660. In constructions that insert stator portions 690, each stator portion 690 would be inserted and interlocked with the adjacent stator portions 690 as has been described.

Constructions that use forms 670, 675 eliminate the need for alignment members on each lamination. In addition, the forms 670, 675 can be manufactured to completely surround the core 660, thus eliminating the need for components such as slot liners and end insulators. Thus, the use of forms 670, 675 can greatly simplify the manufacturing process by eliminating several components and features.

FIGS. 25-28 illustrate, following the conventions known to those skilled in the art, the direction of the conductors associated with the coil sides placed in the slots. In the construction shown in FIG. 28, the coil positioned on a tooth is wound in one direction and the coil positioned on an adjacent tooth of the same core portion is wound, using the same single continuous wire conductor, in an opposite direction so that the electric current in all the conductors placed in a particular slot and belonging to the same phase flows in the same axial direction. In another construction, all the coils are wound in the same direction with each using a different wire. A supplementary operation is then required to electrically connect the end leads of the coils so that the electric current in all the conductors placed in a particular slot and belonging to the same phase flows in the same direction. While FIGS. 25-28 have been used to illustrate a winding procedure in which a single continuous conductor is used, one of ordinary skill in the art will realize that this procedure could be employed with any construction discussed herein as well as with other constructions. For example, this procedure could be employed with core portions that include only two teeth or more than three teeth.

The constructions illustrated herein are suitable for use in producing stators for use in electric motors, generators, or other electric machines. In addition, the invention illustrated herein can be used to produce single phase or polyphase, e.g. three phase, electric machines. Furthermore, the stator illustrated herein can be employed in AC or DC electric machines as well as electric machines with single layer or double layer windings.

Figure 25:
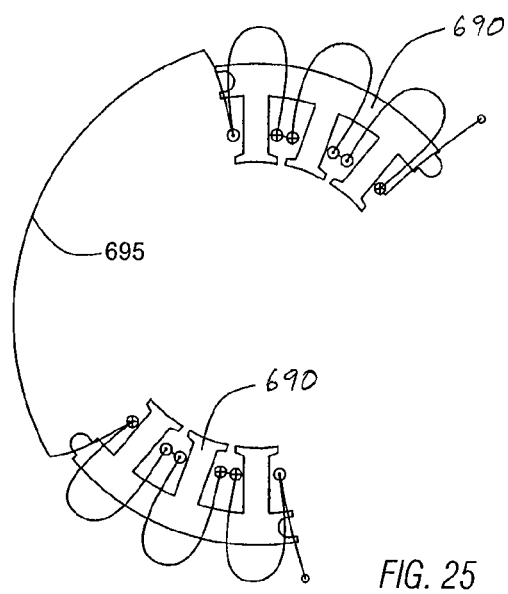
FIG. 25 is a schematic illustration of two stator portions (modules) electrically connected to one another to define one phase of a motor.
Figure 26:
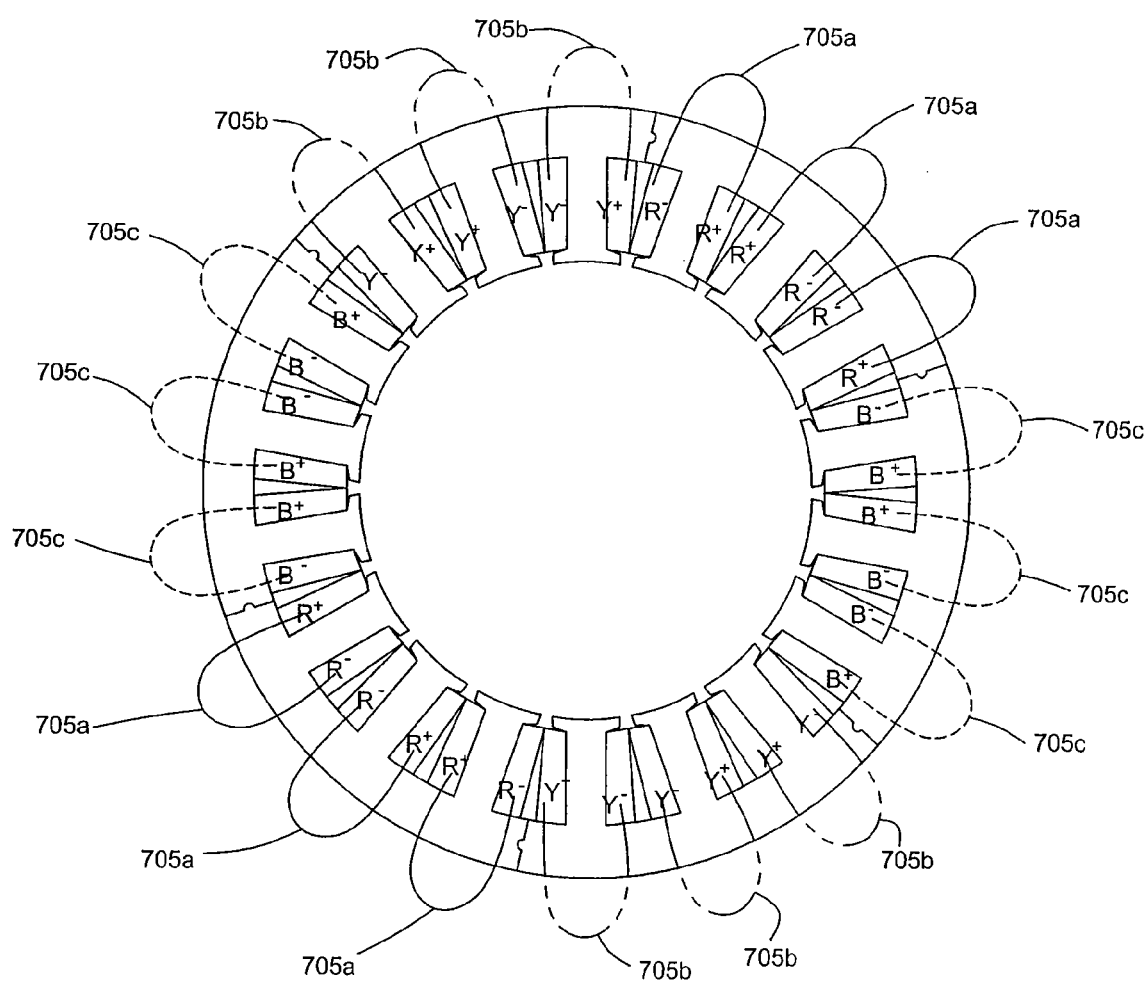
FIG. 26 is a schematic illustration of six stator portions (modules) connected to one another to define a three phase motor stator.
Figure 27:
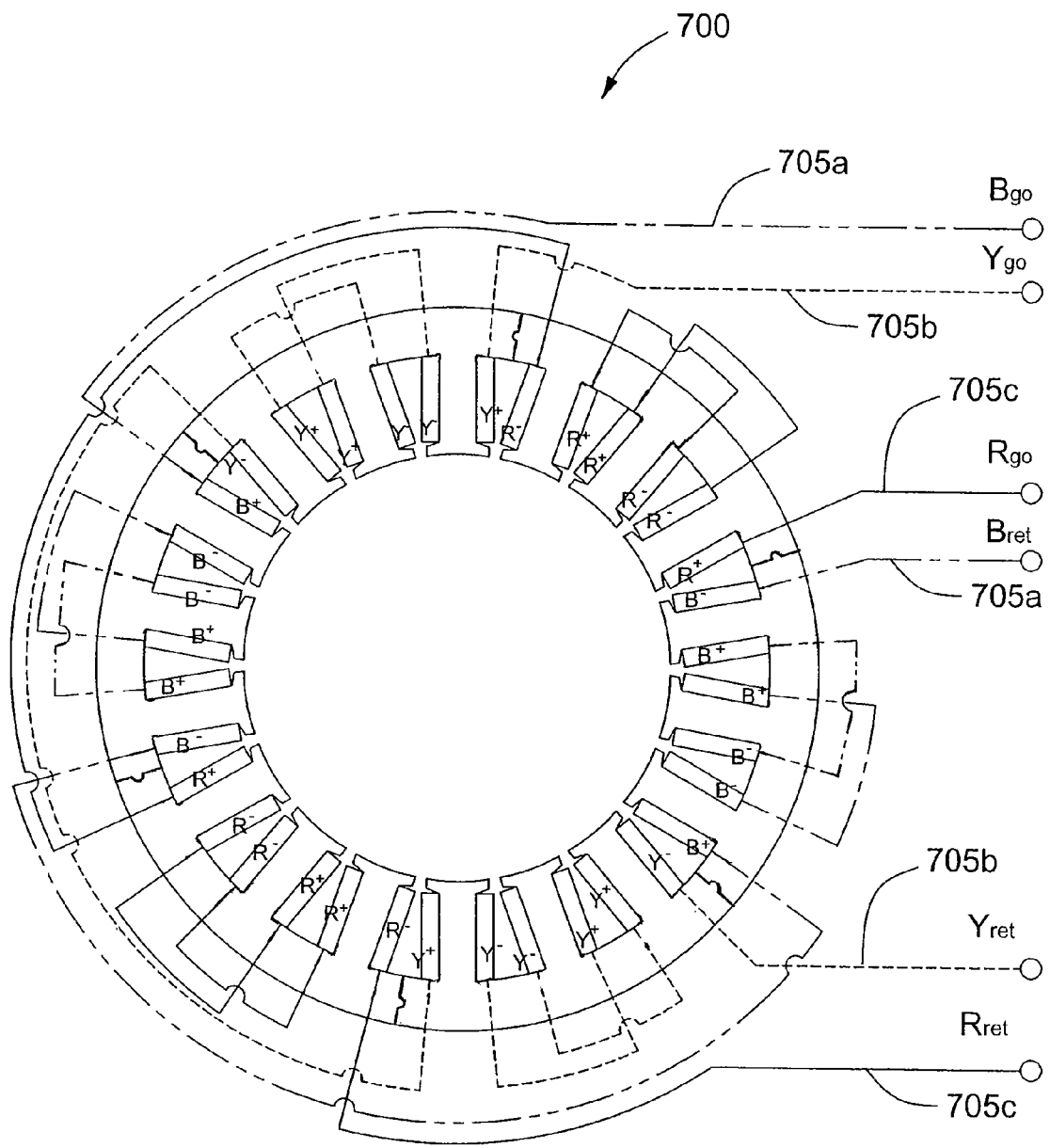
FIG. 27 is a schematic illustration of the three phase motor of FIG. 26 including inter-module and external lead electrical connections.
Figure 28:
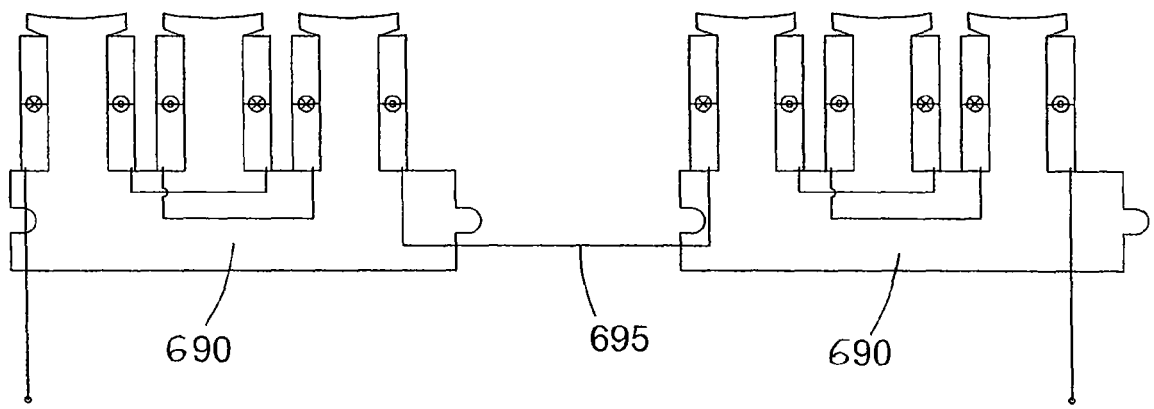
FIG. 28 is a schematic illustration of two stator portions (modules) before bending connected to one another to define one phase of a motor.

FIGS. 25-28 illustrate winding and wiring arrangements suitable for use with the invention described herein. FIG. 25 is similar to FIG. 18 in that it illustrates two core segments 690 that are electrically connected to define one of the phases of the stator. A long conductor (e.g., wire) 695 extends between the two core segments 690 to allow the core segments 690 to be spaced apart from one another while still using a single continuous conductor to define the windings of the phase. FIGS. 26 and 27 illustrate the winding and wiring for a complete three-phase stator 700 with 18-slots and a double layer winding with coils wound around every tooth. Such a stator is suitable to be used, for example, in conjunction with a 16-pole magnetic rotor to operate as a brushless PM motor. Three separate but continuous conductors 705a, 705b, 705c can be used to produce the stator 700, thus eliminating any breaks or internal connections within the stator 700. A further advantage of the poly-phase construction is that stator portions 80 can be economically manufactured using a spool winder 659 with a single needle 802, as schematically shown in FIG. 29.

It should be noted that while the core portions and stator segments illustrated herein include three teeth, other constructions may include only two teeth or more than four teeth. As such, the invention should not be limited to constructions employing three teeth. Furthermore, there is no relationship between the number of teeth in the core portions and the stator segments and the number of phases in the completed stator. For example, a three-phase stator may be manufactured using stator segments that include four teeth if desired.

Thus, the invention provides, among other things, a new and useful stator for an electric motor. The constructions of the stator and the methods of manufacturing the stator described herein and illustrated in the figures are presented by way of example only and are not intended as a limitation upon the concepts and principles of the invention. Various features and advantages of the invention are set forth in the following claims.

What is claimed is:

1. A stator for an electric machine, the stator comprising:
   a plurality of core segments interconnected with one another, at least one core segment including a plurality of teeth and a back portion that at least partially interconnects the teeth;
   a first one-piece mold defining a first end insulator portion and a plurality of slot insulator portions;
   a second one-piece mold defining a second end insulator portion and a second plurality of slot insulator portions, the plurality of core segments positioned between the first mold and the second mold such that the molds align and insulate the core portions; and
   a plurality of coils, each coil surrounding at least a portion of one tooth, wherein each coil that surrounds a portion of a tooth of the same core segment is electrically connected to at least partially define a first of a plurality of phase windings.

2. The stator of claim 1, wherein the slot insulator portions completely insulate the slots such that no portion of the core segment comes into direct physical contact with any of the plurality of coils.

3. The stator of claim 1, wherein all coils surrounding teeth of a single core segment are interconnected to at least partially define one phase winding.

4. The stator of claim 1, wherein each of the plurality of core segments includes a center tooth having a first profile, a first end tooth having a second tooth profile, and a second end tooth having a third tooth profile, the first tooth profile being different than the second tooth profile and the third tooth profile.

5. The stator of claim 4, wherein the first profile is adapted to receive a pre-wound coil.

6. The stator of claim 4, wherein the first end tooth of a first core segment cooperates with the second end tooth of an adjacent core segment to define a fourth tooth profile that is substantially the same as the first tooth profile.

7. The stator of claim 6, wherein the total number of coils in the plurality of coils is equal to one half the sum total number of teeth having the first tooth profile and the fourth tooth profile.

8. The stator of claim 4, wherein only the center tooth of each core segment is adapted to receive a coil.

9. The stator of claim 1, wherein the back portion of each core segment has a first arrangement in which the teeth of that core segment are a first distance from one another and a second arrangement in which the teeth of that core segment are a second distance from one another, the second distance being smaller than the first distance.

10. The stator of claim 9, wherein each of the plurality of core segments includes a center tooth, a first end tooth, and a second end tooth, and wherein the center tooth is configured to receive a coil when the core segment is in the first arrangement, and wherein the first end tooth and the second end tooth inhibit removal of the coil when the core segment is in the second arrangement.

11. The stator of claim 1, wherein the back portions of each of the plurality of core segments cooperate to define a continuous back.

12. The stator of claim 1, wherein the first mold and the second mold are mechanically or chemically bonded to one another.

13. The stator of claim 1, wherein the first mold and the second mold are substantially identical.

14. The stator of claim 1, wherein each of the plurality of core segments includes at least two teeth.

15. A stator for an electric machine, the stator comprising:
   a first one-piece mold that includes a first end insulator portion and a plurality of slot insulator portions;
   a first stator core portion that includes a first back portion and a first plurality of teeth that cooperate to define a first plurality of slots, the first stator core portion positioned within the first mold such that the first back portion contacts the first end insulator portion and the first plurality of slot insulator portions fit within the first plurality of slots;
   a second one-piece mold that includes a second end insulator portion and a second plurality of slot insulator portions;
   a second stator core portion that includes a second back portion and a second plurality of teeth that cooperate to define a second plurality of slots, the second stator core portion positioned within the second mold such that the second back portion contacts the second end insulator portion and the second plurality of slot insulator portions fit within the second plurality of slots, the first mold and the second mold connected to one another such that the first plurality of slots are aligned with the second plurality of slots to define complete slots, the first plurality of slot insulator portions and the second plurality of slot insulator portions cooperating to completely insulate the complete slots; and
   a plurality of coils, wherein a first of the plurality of coils surrounds a first tooth of the first stator core portion and a second of the plurality of coils surrounds a second tooth of the first stator core portion, wherein the first coil and the second coil each surrounds a portion of a tooth of the same core segment and are electrically connected to at least partially define a first of a plurality of phase windings.

16. The stator of claim 15, further comprising a plurality of coils, each coil at least partially disposed in one of the complete slots.

17. The stator of claim 16, wherein the slot insulator portions completely insulate the complete slots such that no portion of the first stator core portion and second stator core portion comes into direct physical contact with any of the plurality of coils.

18. The stator of claim 15, wherein the first stator core portion includes a plurality of core segments, each of the plurality of core segment positioned adjacent another of the plurality of core segments.

19. The stator of claim 18, wherein a first core segment of the plurality of core segments includes a first tooth, a second tooth, and a third tooth, and wherein the first tooth is configured to receive a coil when the first core segment is in a first arrangement, and wherein the second tooth includes a first tooth tip portion and the third tooth includes a second tooth tip portion, and wherein the first tooth tip portion and the second tooth tip portion at least partially cover a portion of the coil when the first core segment is in a second arrangement to inhibit removal of the coil from the first tooth.

20. The stator of claim 18, wherein each of the plurality of core segments is formed from a powdered metal.

21. The stator of claim 18, wherein each of the plurality of core segments includes a center tooth having a first profile, a first end tooth having a second tooth profile, and a second end tooth having a third tooth profile, the first tooth profile being different than the second tooth profile and the third tooth profile.

22. The stator of claim 21, wherein the first profile is adapted to receive a pre-wound coil.

23. The stator of claim 21, wherein the first end tooth of a first core segment cooperates with the second end tooth of an adjacent core segment to define a fourth tooth profile that is substantially the same as the first tooth profile.

24. The stator of claim 23, wherein the total number of coils in the plurality of coils is equal to one half the sum total number of teeth having the first tooth profile and the fourth tooth profile.

25. The stator of claim 21, wherein only the center tooth of each core segment is adapted to receive a coil.

26. The stator of claim 18, wherein the plurality of core segments cooperate to define a continuous back.

27. The stator of claim 18, wherein each of the plurality of core segments includes at least two teeth.

28. The stator of claim 15, wherein the first back portion has a first arrangement in which the teeth of that core portion are a first distance from one another and a second arrangement in which the teeth of that core portion are a second distance from one another, the second distance being smaller than the first distance.

29. The stator of claim 15, wherein the first mold and the second mold are mechanically or chemically bonded to one another.

30. The stator of claim 15, wherein the first mold and the second mold are substantially identical.

31. The stator of claim 15, wherein the first stator core portion is formed from a plurality of stacked laminations, each lamination having a back portion that cooperates with back portions of adjacent laminations to define a continuous annulus.

* * * * *

UNITED STATES PATENT AND TRADEMARK OFFICE
CERTIFICATE OF CORRECTION

| | | |
|---|---|---|
| PATENT NO. | : 7,821,175 B2 | Page 1 of 1 |
| APPLICATION NO. | : 12/333719 | |
| DATED | : October 26, 2010 | |
| INVENTOR(S) | : Ionel et al. | |

It is certified that error appears in the above-identified patent and that said Letters Patent is hereby corrected as shown below:

On title page Item (56) References Cited, OTHER PUBLICATIONS, insert --European Search Report for Application No. 06255579.2 dated March 30, 2010 (7 pages)--.

Signed and Sealed this

Thirty-first Day of May, 2011

David J. Kappos
*Director of the United States Patent and Trademark Office*